US010354698B2

(12) United States Patent
Yoshida

(10) Patent No.: US 10,354,698 B2
(45) Date of Patent: Jul. 16, 2019

(54) OPENING/CLOSING MECHANISM FOR ROTARY COVER

(71) Applicant: Panasonic Intellectual Property Management Co., Ltd., Osaka (JP)

(72) Inventor: Kazuyoshi Yoshida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/752,978

(22) PCT Filed: Aug. 8, 2016

(86) PCT No.: PCT/JP2016/003644
§ 371 (c)(1),
(2) Date: Feb. 15, 2018

(87) PCT Pub. No.: WO2017/038018
PCT Pub. Date: Mar. 9, 2017

(65) Prior Publication Data
US 2018/0240503 A1 Aug. 23, 2018

(30) Foreign Application Priority Data

Sep. 1, 2015 (JP) ................................. 2015-172372

(51) Int. Cl.
*G11B 33/02* (2006.01)
*G11B 17/04* (2006.01)
*G11B 23/03* (2006.01)

(52) U.S. Cl.
CPC ........ *G11B 33/027* (2013.01); *G11B 17/0405* (2013.01); *G11B 23/0308* (2013.01)

(58) Field of Classification Search
None
See application file for complete search history.

(56) References Cited

U.S. PATENT DOCUMENTS

| 4,345,700 A * | 8/1982 | Souza ................... G01F 11/46 222/438 |
| 2002/0136139 A1* | 9/2002 | Yano ................... G11B 33/025 720/655 |

(Continued)

FOREIGN PATENT DOCUMENTS

| JP | 2001-319410 | 11/2001 |
| JP | 2003-022664 | 1/2003 |

(Continued)

OTHER PUBLICATIONS

International Search Report of PCT application No. PCT/JP2016/003644 dated Oct. 25, 2016.

*Primary Examiner* — William J Klimowicz
(74) *Attorney, Agent, or Firm* — McDermott Will & Emery LLP

(57) ABSTRACT

A rotation cover opening/closing mechanism includes a transparent plate-shaped cover, a shaft body, and a turning mechanism. The cover closes an opening portion formed in a part of an upper surface of device body. One end of the shaft body is perpendicularly fixed to the cover, and at least a part of the shaft body at the other end of the shaft body is inserted into the device body. The turning mechanism rotatably supports the shaft body inside the device body to allow turning of the cover around the shaft body in a plane parallel with the upper surface of the device body. The turning mechanism includes a limitation portion that limits a rotation angle of the shaft body to a fixed range such that the cover turns between a cover closing position where the cover closes the opening portion, and a cover opening position where the cover opens the opening portion.

6 Claims, 6 Drawing Sheets

(56) References Cited

U.S. PATENT DOCUMENTS

2003/0188883 A1* 10/2003 Yano .................. F16M 11/10
                                                    174/66
2005/0249069 A1* 11/2005 Aoki .................. G11B 17/0405
                                                   369/47.1

FOREIGN PATENT DOCUMENTS

| JP | 2003022664 A | * | 1/2003 |
| JP | 2004-265539 | | 9/2004 |
| JP | 2004265539 A | * | 9/2004 |

* cited by examiner

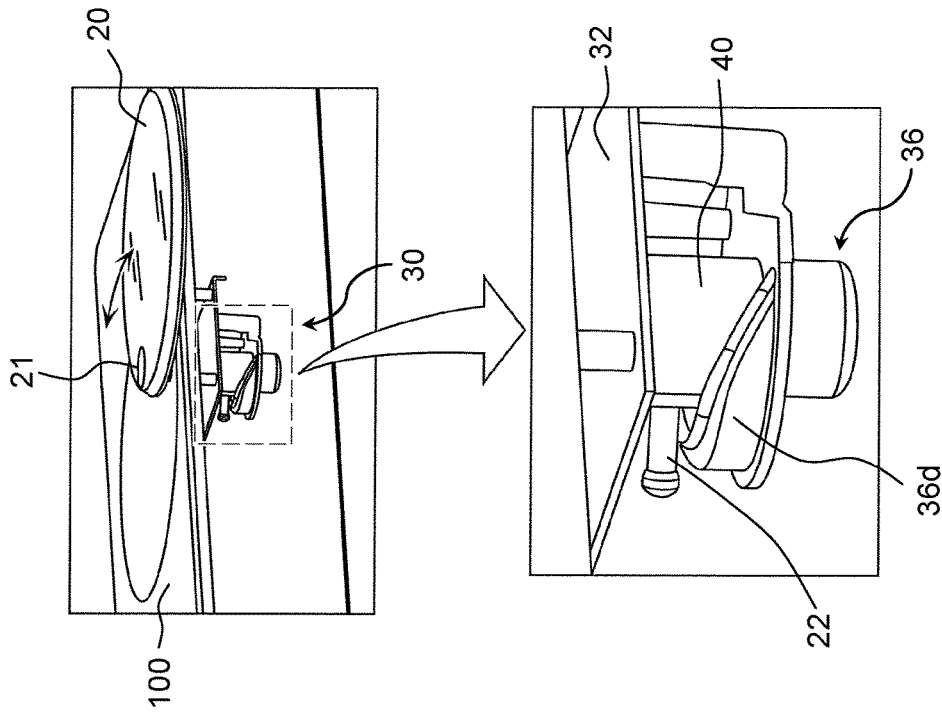
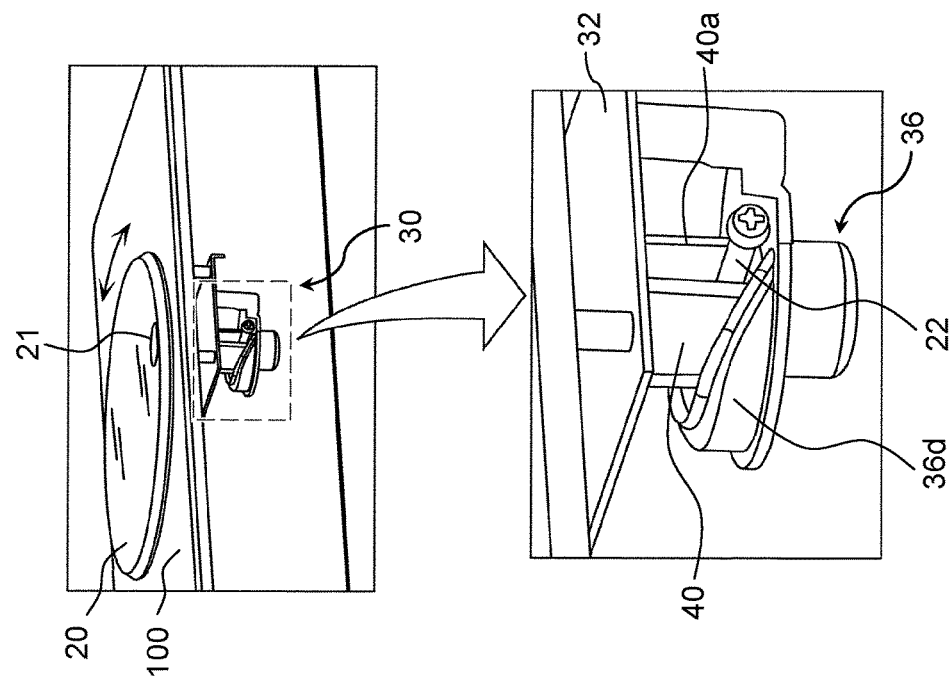

OPENING/CLOSING MECHANISM FOR ROTARY COVER

CROSS-REFERENCE TO RELATED APPLICATIONS

This application is a U.S. national stage application of the PCT International Application No. PCT/JP2016/003644 filed on Aug. 8, 2016, which claims the benefit of foreign priority of Japanese patent application No. 2015-172372 filed on Sep. 1, 2015, the contents all of which are incorporated herein by reference.

TECHNICAL FIELD

The present disclosure relates to a rotation cover opening/closing mechanism and a disk drive device.

BACKGROUND ART

Patent Literature (PTL) 1 discloses a disk drive device which includes a device body equipped with a storage portion, a cover body, a rotational urging spring, a lock mechanism, and an unlock mechanism. The cover body is turnably supported on the device body via a shaft body corresponding to a support shaft, and is turnable from a cover opening position to a cover closing position. The rotational urging spring accumulates rotational urging force for turning the cover body from the cover closing position to the cover opening position of the cover body during turning of the cover body from the cover opening position to the cover closing position. The lock mechanism includes engaging portions disposed nearer the shaft body and nearer the device body, and limits turning of the cover body by engagement of the engaging portions. The unlock mechanism shifts the engaging portions disposed nearer the shaft body and nearer the device body relative to each other to allow rotation of the cover body by the rotational force of the rotational urging spring. This disk drive device rotates the cover body in a plane parallel with a disk to facilitate attachment and detachment of the disk.

CITATION LIST

Patent Literature

PTL 1: Unexamined Japanese Patent Publication No. 2004-265539

SUMMARY

Provided according to the present disclosure is a rotation cover opening/closing mechanism and a disk drive device capable of stopping a cover, which is transparent and rotates in a plane, at an appropriate cover closing position.

A rotation cover opening/closing mechanism according to an embodiment of the present disclosure includes a cover that is transparent and plate-shaped, a shaft body, and a turning mechanism. The cover closes an opening portion formed in a part of an upper surface of device body. One end of the shaft body is perpendicularly fixed to the cover, and at least a part of the shaft body at the other end of the shaft body is inserted into the device body. The turning mechanism rotatably supports the shaft body inside the device body to allow turning of the cover around the shaft body in a plane parallel with the upper surface of the device body. The turning mechanism includes a limitation portion that limits a rotation angle of the shaft body to a fixed range such that the cover turns between a cover closing position where the cover closes the opening portion, and a cover opening position where the cover opens the opening portion.

In addition, a disk drive device according to an embodiment of the present disclosure includes a device body, a cover that is transparent and plate-shaped, a shaft body, and a turning mechanism. The device body includes an opening portion in an upper surface of the device body, and a disk is attached to and detached from the device body via the opening portion. The cover closes the opening portion. One end of the shaft body is perpendicularly fixed to the cover, and at least a part of the shaft body at the other end of the shaft body extends toward an inner space of the device body. The turning mechanism rotatably supports the shaft body inside the device body to allow turning of the cover around the shaft body in a plane parallel with the upper surface of the device body. The turning mechanism limits a rotation angle of the shaft body to a fixed range such that the cover turns between a cover closing position where the cover closes the opening portion, and a cover opening position where the cover opens the opening portion.

A rotation cover opening/closing mechanism and a disk drive device according to the present disclosure are capable of stopping a cover, which is transparent and rotates in a plane, at an appropriate cover closing position.

BRIEF DESCRIPTION OF DRAWINGS

FIG. 6A is a perspective view schematically illustrating an example of a positional relationship between a protrusion portion and an up-down guide in the disk drive device according to the first exemplary embodiment when the cover is located at the cover closing position.

FIG. 6B is a perspective view schematically illustrating an example of a positional relationship between the protrusion portion and the up-down guide in the disk drive device according to the first exemplary embodiment when the cover is located at a cover opening position.

Figure 1A:
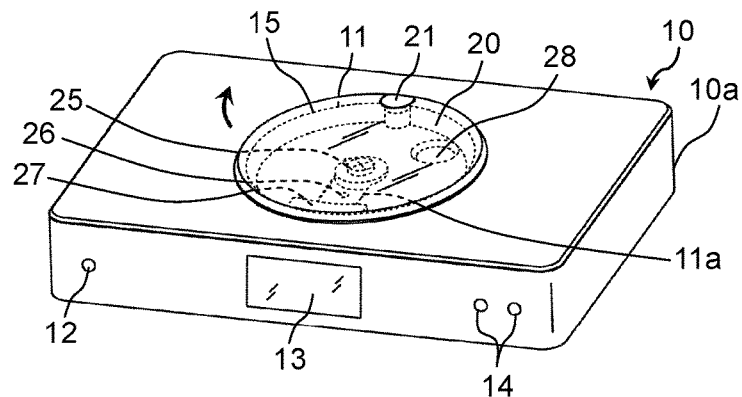
FIG. 1A is a perspective view schematically illustrating an example of an external appearance of a disk drive device according to a first exemplary embodiment.

DESCRIPTION OF EMBODIMENTS (Knowledge on Which the Present Disclosure has Been Based)

The inventors of the present application have found following problems arising from the disk drive device disclosed in PTL 1.

The rotation cover opening/closing mechanism included in the disk drive device disclosed in PTL 1 may deteriorate design quality when the cover has a transparent body for visibility of a disk from the outside.

For stopping the cover at an appropriate cover closing position during rotation of the cover from the cover opening position to the cover closing position, following configurations are considerable, for example. A protrusion portion is provided on a housing of the disk drive device, and the protrusion portion of the housing is brought into contact with the cover when the cover reaches the cover closing position by rotation. Alternatively, a protrusion portion is provided on the cover, and the protrusion portion of the cover is brought into contact with the housing when the cover reaches the cover closing position by rotation.

However, the protrusion portion provided on the housing or the cover may deteriorate the appearance of the disk drive device and lower design quality.

Provided according to the present disclosure is a rotation cover opening/closing mechanism, and a disk drive device capable of stopping a cover, which is transparent and rotates in a plane, at an appropriate cover closing position without deteriorating design quality.

In a part of following description, rotational movement of an object is expressed in two different expressions of "rotation" and "turning" to distinguish between two types of rotational movement, for the purpose of convenience of description. Initially, "rotation" may be used to indicate general rotational movement of an object in a wide sense. For example, "rotation" constituting a part of the name "rotation cover" has a general meaning of rotation of this case. On the other hand, "turning" is intended to indicate such a rotational movement that a rotational center of an object is located away from a center of the object and close to a peripheral portion of the object, or located outside the object. For example, the term "turning" is used to indicate movements of a rotation cover, a protrusion portion, and a turning portion. On the other hand, the term "rotation" is intended to indicate movement in a narrow sense, i.e., such a movement that a rotational center of an object is substantially aligned with a center of the object. For example, the term "rotation" is used to indicate movements of a shaft body, a rotation cover, and a screw.

Exemplary embodiments are hereinafter described in detail with reference to the drawings. However, excessively detailed description may be omitted. For example, detailed description of well-known matters, and repeated description of substantially identical configurations may be omitted. These omissions are made to avoid unnecessary redundancy in the following description, and help easy understanding of those skilled in the art.

Note that the accompanying drawings and the following description are only presented to help those skilled in the art sufficiently understand the present disclosure, and not intended to impose any limitations to subject matters described in the appended claims In addition, the respective figures are presented only as schematic views which do not necessarily provide strict depiction. In the respective figures, substantially similar constituent elements are given similar reference numbers. Description of these constituent elements is omitted or simplified in some cases.

First Exemplary Embodiment

A first exemplary embodiment is hereinafter described with reference to FIGS. 1A through 6B.

[1-1. External Appearance]

Initially described is an external appearance of disk drive device 10 according to the first exemplary embodiment.

Figure 1B:
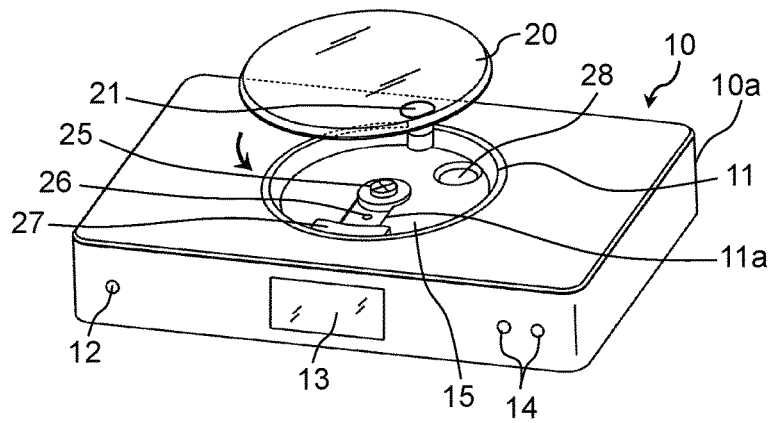
FIG. 1B is a perspective view schematically illustrating the example of the external appearance of the disk drive device according to the first exemplary embodiment.
Figure 1C:
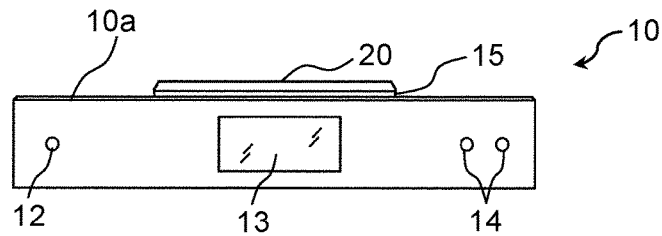
FIG. 1C is a front view schematically illustrating the example of the external appearance of the disk drive device according to the first exemplary embodiment.
Figure 1D:
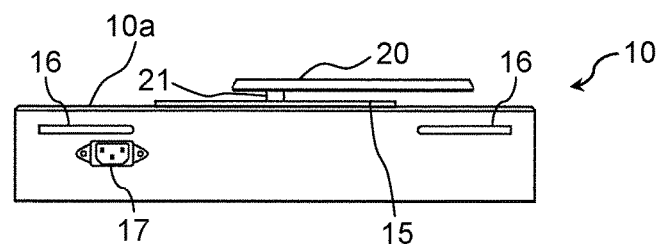
FIG. 1D is a rear view schematically illustrating the example of the external appearance of the disk drive device according to the first exemplary embodiment.

FIGS. 1A and 1B are perspective views schematically illustrating an example of the external appearance of disk drive device 10 according to the first exemplary embodiment. FIG. 1A is a perspective view of device body 10a of disk drive device 10 in a closed state of cover 20. FIG. 1B is a perspective view of device body 10a of disk drive device 10 in an opened state of cover 20. In FIGS. 1A and 1B, device body 10a of disk drive device 10 is viewed from the front and obliquely above. FIG. 1C is a front view schematically illustrating an example of the external appearance of disk drive device 10 according to the first exemplary embodiment. FIG. 1D is a rear view schematically illustrating an example of the external appearance of disk drive device 10 according to the first exemplary embodiment. According to this exemplary embodiment, a display unit 13 side of disk drive device 10 corresponds to the front (or fore side), while a side opposite to the front corresponds to a rear.

Disk drive device 10 according to this exemplary embodiment is a device configured to read data from a disk-shaped recording medium on which data is recorded, such as a music compact disk (CD). Disk drive device 10 may be configured not only to perform this reading function, but also to write data to a disk-shaped recording medium such as a writable CD. When data to be read by disk drive device 10 is music content data, for example, disk drive device 10 reproduces audio signals corresponding to the data, and outputs sound (music) corresponding to the audio signals from a loudspeaker (not illustrated) through an amplifier (not illustrated).

Respective constituent elements of disk drive device 10 are now described with reference to FIGS. 1A through 1D.

Disk drive device 10 includes power supply button 12, display unit 13, and operation buttons 14 on the front.

Power supply button 12 functioning as a main power supply switch of disk drive device 10 is operated by a user. A power supply state of disk drive device 10 is switched between on (conductive state or operational state) and off (non-conductive state or non-operational state) in accordance with an operation by the user input through power supply button 12. Power supply button 12 may be constituted of a press button performing a momentary operation, for example.

Display unit 13 displays characters or symbols to provide various types of information for the user. Information displayed on display unit 13 includes information about devices such as a power supply state, information about a recording medium (not illustrated) placed on disk tray 15 described below and content under reproduction, current time, and others. Display unit 13 may be constituted of an organic electroluminescence (EL) display or a liquid crystal display, for example. In addition, a part or the whole of display unit 13 may be constituted of a touch panel which receives a touch operation from the user, or may display icons or the like for operations.

Operation buttons 14 are buttons operated by the user. Operation buttons 14 are operated to provide various types of settings, such as volume control, selection of content recorded on a recording medium, and time adjustment of a clock (not illustrated) and a timer function displayed on display unit 13 of disk drive device 10. Each of operation buttons 14 may be constituted of a press button switch performing a momentary operation, for example.

Switching of the power supply state and various types of user operations described above may be performed via a remote controller (not illustrated), rather than the buttons included in the disk drive device 10 described herein.

Disk drive device 10 includes circular opening portion 11 formed in an upper surface of device body 10a, and circular disk tray 15 fitted to opening portion 11. Disk tray 15 has a substantially dish shape. A bottom surface of disk tray 15 is located at a position lower than the upper surface of device body 10a of disk drive device 10.

According to this exemplary embodiment, a side relatively close to an installation surface (not illustrated) on which disk drive device 10 is installed is referred to as a "lower side", while a side relatively far from the installation surface is referred to as an "upper side". Accordingly, in a state of disk drive device 10 disposed on an installation surface, a surface of device body 10a on the installation surface side corresponds to a lower surface, while a surface on a side (surface shown in an upper part of each of FIGS. 1A and 1B) opposite to the lower surface corresponds to an upper surface. The expressions "upper side" and "lower side" in the description of this exemplary embodiment are only terms used for convenience of description. The positional relationship between these expressions only indicates a relative relationship.

Disk tray 15 has an opening at a center of the bottom surface. Disk holder 25 protrudes upward through this opening. Disk holder 25 rotates a recording medium corresponding to a target for reading or other processes while holding the recording medium.

Disk tray 15 further has an opening in a space between a circumferential edge of disk tray 15 and the opening provided on the bottom surface of disk tray 15 and through which disk holder 25 protrudes from below. Exposed through this opening is light pickup 26 which emits laser beams for reading data from the recording medium or writing data to the recording medium. As illustrated in FIGS. 1A and 1B, the opening through which disk holder 25 protrudes, and the opening through which light pickup 26 is exposed may constitute a single continuous opening in disk tray 15.

As illustrated in FIGS. 1A and 1B, disk tray 15 further includes illumination unit 27 which extends in a terrace shape toward disk holder 25 described above from a part of the circumferential edge rising from the bottom surface. Illumination unit 27 has an opening on a disk holder 25 side surface. A light source (not illustrated) such as a light emitting diode (LED) is disposed on an inner side of the opening (front side in FIGS. 1A and 1B). The terrace-shaped portion of illumination unit 27 is configured to guide light emitted from the light source. Accordingly, light emitted from the light source is guided toward the terrace-shaped portion and emitted through the opening. The light source may be constituted of a light source which emits light not containing wavelength components easily causing errors during a reading operation or a writing operation from and to respective types of recording medium by using laser beams, or light containing a smallest possible amount of such wavelength components.

The shape of illumination unit 27 illustrated in FIGS. 1A and 1B is presented only by way of example. The shape of the portion guiding light and the shape of the opening according to this exemplary embodiment are not limited to the specific shapes described herein. In addition, the opening may be a single opening continuing from the opening through which disk holder 25 protrudes, and the opening through which light pickup 26 is exposed. According to this exemplary embodiment, as illustrated in FIGS. 1A and 1B, these openings constitute opening portion 11a forming a single opening.

In other words, opening portion 11a corresponds to an unclosed region of circular opening portion 11 left unclosed after disk tray 15 partially closes circular opening portion 11.

While the configuration example illustrated in FIGS. 1A and 1B shows disk tray 15 including one illumination unit 27, disk tray 15 may include a plurality of illumination units 27.

As illustrated in FIGS. 1A and 1B, circular recess portion 28 is further formed in the bottom surface of disk tray 15. Recess portion 28 is provided to reduce collision between a finger of the user touching a circumferential end of the recording medium and the bottom surface of disk tray 15 at the time of attachment of the recording medium to disk tray 15, or removal of the recording medium from disk tray 15. Recess portion 28 formed in the bottom surface of disk tray 15 allows the user to hold the recording medium by an inner part of the finger (i.e., at a position relatively away from an end of the finger, such as a finger pulp). Accordingly, attachment or detachment of the recording medium is facilitated for the user according to disk drive device 10.

The shape of recess portion 28 illustrated in FIGS. 1A and 1B is presented only by way of example. The shape of recess portion 28 according to this exemplary embodiment is not limited to this specific example. Recess portion 28 may have any shape as long as recess portion 28 includes an area easy to come into contact with the finger of the user touching the end of the recording medium in the bottom surface of disk tray 15 at the time of attachment and detachment of the recording medium.

While FIGS. 1A and 1B illustrate a configuration example of disk tray 15 including one recess portion 28, disk tray 15 may include a plurality of recess portions 28.

As illustrated in FIGS. 1A through 1D, circular transparent cover 20 is further provided on an upper surface side of device body 10a of disk drive device 10. Cover 20 has a plate shape, and is molded in a size substantially equivalent to the size of disk tray 15. Cover 20 may be made of a transparent material containing resin as a main component, for example. However, cover 20 may be made of other transparent materials such as glass.

Disk drive device 10 further includes shaft body 21 constituted of a substantially long columnar body. As illustrated in FIGS. 1A and 1B, cover 20 is connected to device body 10a of disk drive device 10 via shaft body 21. A connection portion of this connection is hereinafter specifically described.

Shaft body 21 penetrates the vicinity of a circumferential edge of cover 20. One axial end of shaft body 21 is fixed to plate-shaped cover 20 in such a direction that an axis of shaft body 21 extends perpendicularly to cover 20. The end of shaft body 21 on the side fixed to cover 20 is hereinafter also referred to as a "first end". In addition, shaft body 21 penetrates the vicinity of disk tray 15 in such a direction as to extend perpendicularly to an upper surface of disk drive device 10. In this case, the other axial end of shaft body 21 extends toward an inner space (not illustrated in FIGS. 1A through 1D) of device body 10a of disk drive device 10. Connection between cover 20 and disk drive device 10 is made via shaft body 21 thus configured.

Shaft body 21 may be made of a material containing metal as a main component, for example. However, shaft body 21 may be made of other materials such as resin. FIGS. 1A and 1B illustrate only an end surface of shaft body 21 at the axial first end.

Cover 20 connected to disk drive device 10 is a rotation cover which turns in a plane substantially in parallel with the upper surface of device body 10a of disk drive device 10. Cover 20 turns in a range of predetermined fixed angles around shaft body 21. In each of FIGS. 1A and 1B, a turnable direction of cover 20 is indicated by an arrow. Shaft body 21 is fixed to cover 20 as described above, wherefore cover 20 and shaft body 21 turn as one body. When force in a turnable direction is applied to cover 20, this force is transmitted to shaft body 21 fixed to cover 20. Accordingly, shaft body 21 rotates in this direction. As a result, cover 20 turns in linkage with a rotational action of shaft body 21. During this action, an axis of turning of cover 20 and an axis of rotation of shaft body 21 are aligned with each other.

FIGS. 1A and 1C illustrate an example of cover 20 in a state of being located at one end of a turning range (range of predetermined angles), while FIGS. 1B and 1D illustrate an example of cover 20 in a state of being located at the other end of the turning range.

When cover 20 located at a position indicated in FIG. 1B reaches the one end of the turning range (range of predetermined angles) by the turning of cover 20, cover 20 stops at a closing position of circular opening portion 11 as illustrated in FIGS. 1A and 1C. In other words, cover 20 located at the one end of the turning range (range of predetermined angles) covers the whole of disk tray 15 in a plan view of the upper surface of disk drive device 10. This position of cover 20 (position indicated in each of FIGS. 1A and 1C) is also referred to as a "cover closing position" in the following description.

When cover 20 located at the position indicated in FIG. 1A (cover closing position) reaches the other end of the turning range (range of predetermined angles) by the turning of cover 20, cover 20 stops at an opening position of opening portion 11 as illustrated in FIGS. 1B and 1D. As a result, opening portion 11 is opened. This position of cover 20 (position indicated in each of FIGS. 1B and 1D) is also referred to as a "cover opening position" in the following description.

The arrow illustrated in FIG. 1A indicates an approximate direction and an approximate angle of cover 20 shifting (turning) from the cover closing position to the cover opening position.

As apparent from comparison between FIGS. 1C and 1D, a distance between the upper surface of device body 10a of disk drive device 10 (circumferential edge of disk tray 15) and cover 20 when cover 20 is located at the cover closing position is different from that when cover 20 is located at the cover opening position. As illustrated in FIG. 1C, a lower surface of cover 20 located at the cover closing position lies in contact with, or in the vicinity of the upper surface of device body 10a of disk drive device 10 (circumferential edge of disk tray 15). On the other hand, as illustrated in FIG. 1D, the lower surface of cover 20 located at the cover opening position is located away from the upper surface of device body 10a of disk drive device 10 (circumferential edge of disk tray 15).

A part of shaft body 21 between cover 20 and device body 10a of disk drive device 10 (circumferential edge of disk tray 15) appears in FIG. 1D.

Accordingly, a shift of cover 20 (shift between cover closing position and cover opening position) does not become turn in a plane (shift not including upward and downward displacement) around the rotation axis defined on shaft body 21. A shift of cover 20 achieved in this exemplary embodiment is movement containing both turning around the rotation axis of shaft body 21, and displacement (upward and downward displacement) in a direction along the rotation axis of shaft body 21. Details of the shift of cover 20, and a mechanism for realizing this shift will be described below.

As illustrated in FIG. 1D, antennas 16 and power supply socket 17 are provided on the rear of disk drive device 10.

Each of antennas 16 is a bar-shaped component used for transmission and reception of radio waves at the time of data transmission and reception by disk drive device 10 to and from an external device through wireless communication in conformity with predetermined standards such as Wi-Fi (registered trademark).

While FIG. 1D illustrates a configuration example of disk drive device 10 including two antennas 16, disk drive device 10 may include only one antenna 16, or three or more antennas 16. In addition, while antennas 16 in FIG. 1D extend in a horizontal direction, an extension direction of antenna 16 is not limited to the horizontal direction. The extension direction of antennas 16 may have an angle to the horizontal direction. Alternatively, one end of each of antennas 16 may be turnably fixed to disk drive device 10, while the position of the other end of each of antennas 16 may be varied in accordance with a reception status. Furthermore, a length of each of antennas 16 may be made variable.

Power supply socket 17 is a socket configured to connect a power supply cable (power supply cable in conformity with predetermined standards) through which power necessary for disk drive device 10 is obtained from an external power supply.

A thin cushion (not illustrated) may be provided on a part or the whole of the upper surface of the circumferential edge of disk tray 15. When the cushion is made of a material such as elastic resin or rubber, reduction of shock or sound generated between cover 20 and disk tray 15 is achievable by the cushion at the time of direct contact between cover 20 arriving at the cover closing position and disk tray 15. The cushion may be located at the one end position of turning of cover 20 when the cushion is provided on disk tray 15. However, the cushion does not define the end position, nor limit turning of cover 20.

The respective constituent elements visible from the external appearance of disk drive device 10 have been discussed hereinabove. However, these constituent elements do not include constituent elements associated with a shift of cover 20, except for shaft body 21 defining the axis of turning of cover 20. Limitation of angles for turning of cover 20 described above is achieved by a mechanism disposed inside device body 10a of disk drive device 10 and not visible from the external appearance.

The internal mechanism of device body 10a of disk drive device 10 is hereinafter described.

[1-2. Internal Mechanism (Rotation Cover Opening/Closing Mechanism)]

Figure 2:
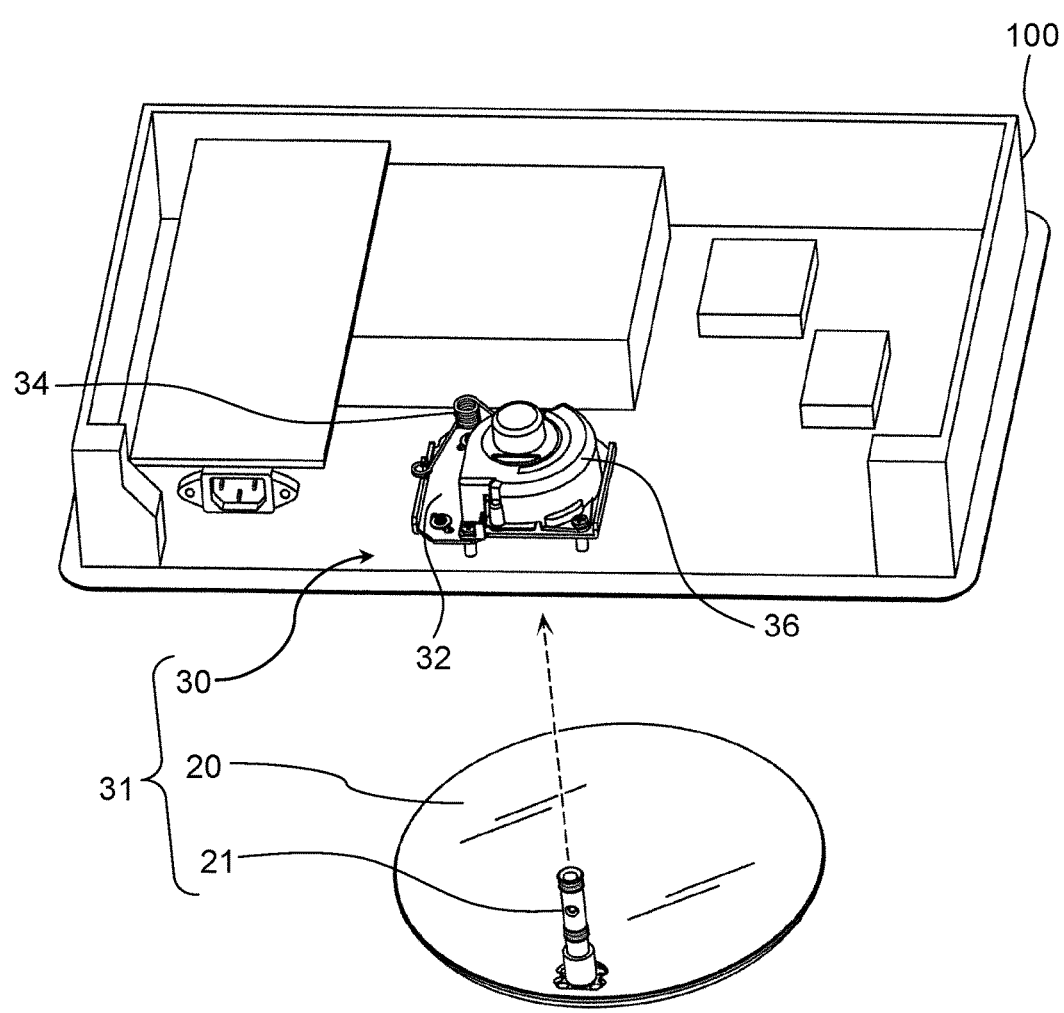
FIG. 2 is a perspective view schematically illustrating an example of an upper housing included in the disk drive device according to the first exemplary embodiment.

FIG. 2 is a perspective view schematically illustrating an example of upper housing 100 included in disk drive device 10 according to the first exemplary embodiment. The perspective view of FIG. 2 illustrates only an upper part (hereinafter referred to as upper housing 100) corresponding to an upper section of device body 10a of disk drive device 10 disassembled into upper and lower sections. The upper part is reversed in an up-down direction from the state illustrated in FIGS. 1A through 1D into such a state that an inner surface of upper housing 100 faces upward, and that a rear side of upper housing 100, i.e., a side located on the rear of disk drive device 10, faces the front. Accordingly, FIG. 2 mainly illustrates an inner structure of device body 10a of disk drive device 10 not shown in the external appearance view in FIGS. 1A through 1D.

Device body 10a accommodates a mechanism for rotating a recording medium, a wiring board for music reproduction and information display, and others, in addition to power supply socket 17 described above. However, technologies and mechanisms not relating to the technology disclosed in this exemplary embodiment are not described herein. Rotation cover opening/closing mechanism 31 included in disk drive device 10 is hereinafter mainly described.

Rotation cover opening/closing mechanism 31 included in disk drive device 10 includes cover 20 and shaft body 21 described above, and turning mechanism 30 described below. Opening/closing mechanism 31 turns cover 20 within a range of predetermined angles. Opening/closing mechanism 31 defines the cover closing position and the cover opening position of cover 20. Opening/closing mechanism 31 changes a position of cover 20 in the up-down direction between the cover closing position and the cover opening position.

[1-2-1. Turning Mechanism]

Turning mechanism 30 is provided on the inner surface of upper housing 100 of disk drive device 10.

Turning mechanism 30 includes base 32, rotational urging spring 34, and shaft body cover 36.

Base 32 is a substantially plate-shaped table made of a material containing metal as a main component, for example. Rotational urging spring 34 and shaft body cover 36 are provided on one of main surfaces of base 32. The other main surface of base 32 is fixed to the inner surface of upper housing 100. Base 32 includes a hole not illustrated in FIG. 2. This hole of base 32 penetrates the one main surface and the other main surface of base 32. A distal end of a second end of shaft body 21 is vertically inserted into the hole. The hole is hereinafter also referred to as a "base through hole". The second end of shaft body 21 herein refers to an end of shaft body 21 on the side opposite to the first end in the axial direction.

The base through hole is a hole that is configured to have a size and a shape sufficient for rotation of shaft body 21 penetrating the base through hole with low resistance or substantially no resistance. In addition, the base through hole formed in base 32 is provided such that at least an area of the base through hole substantially equivalent to an area of a hole formed in disk tray 15 and penetrated by shaft body 21 overlaps with the hole formed in disk tray 15 in the plan view of the upper surface of disk drive device 10. In this case, the second end of shaft body 21 extending toward an inner space of device body 10a of disk drive device 10 enters the base through hole from the main surface of base 32 on the disk tray 15 side (other main surface), penetrates base 32, and protrudes from the main surface of base 32 on the side opposite to disk tray 15 (one main surface) as indicated by a broken arrow in FIG. 2. Rotational urging spring 34 is a torsion coil spring. Rotational urging spring 34 will be detailed below with reference to FIG. 3.

Shaft body cover 36 covers the second end of shaft body 21 protruding from the one main surface of base 32. Shaft body cover 36 will be detailed below with reference to FIG. 5.

A configuration and an operation relating to the above-described limitation of turning performed by turning mechanism 30 are hereinafter described based on a specific example.

[1-2-1-1. Configuration and Operation for Limiting Turning]

Figure 3:
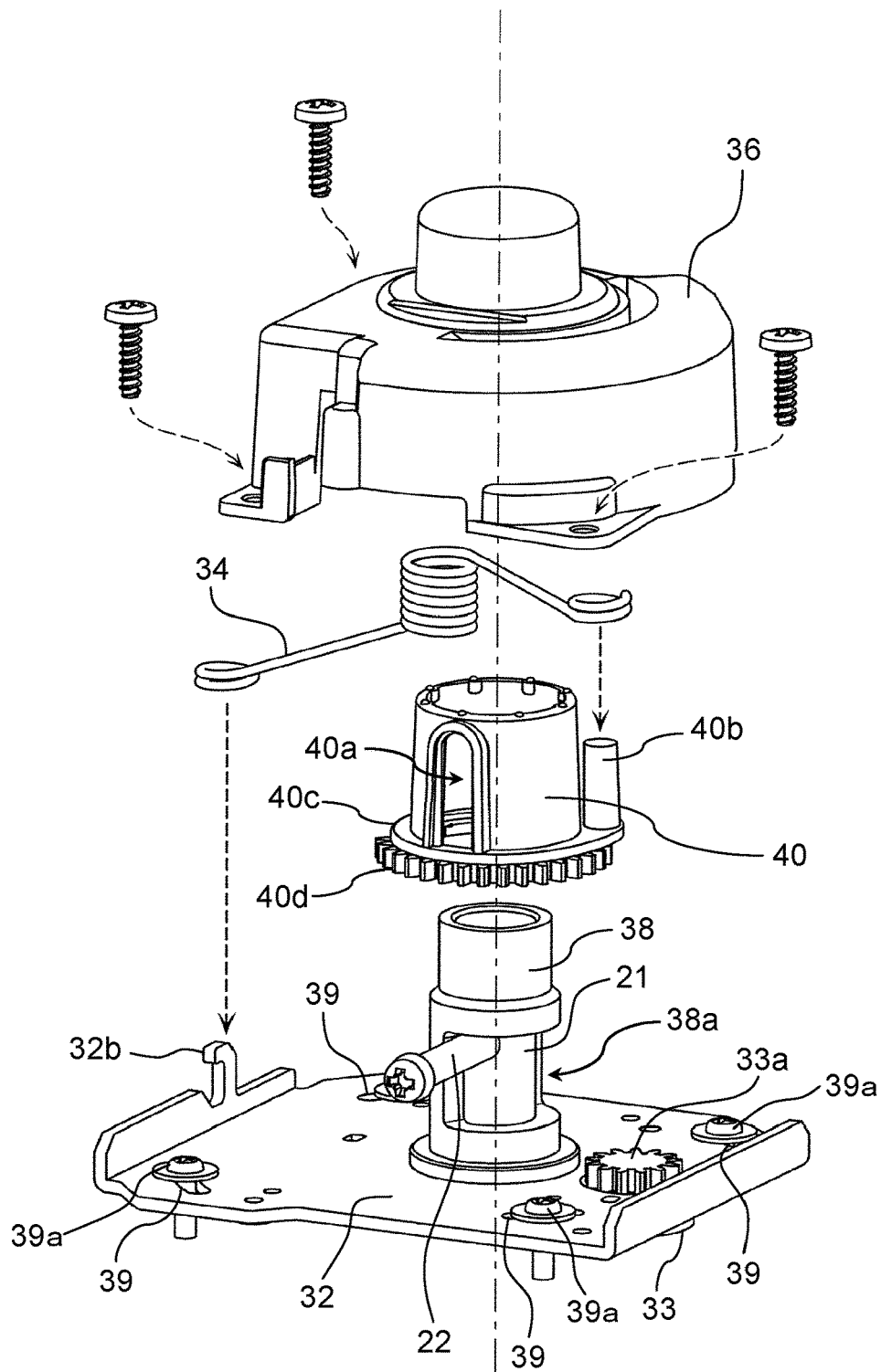
FIG. 3 is an exploded perspective view schematically illustrating a configuration example of a turning mechanism included in the disk drive device according to the first exemplary embodiment.

FIG. 3 is an exploded perspective view schematically illustrating a configuration example of turning mechanism 30 included in disk drive device 10 according to the first exemplary embodiment. FIG. 3 illustrates an exploded perspective view of turning mechanism 30 illustrated in FIG. 2. FIG. 3 also illustrates an external appearance of the second end side of shaft body 21 penetrating base 32 (external appearance disposed inside shaft body cover 36 and not illustrated in FIG. 2). The configurations of turning mechanism 30 and shaft body 21 inside disk drive device 10 are hereinafter described.

Base 32 includes cylindrical body 38 and rotation cover 40 in addition to rotational urging spring 34 and shaft body cover 36 illustrated in FIG. 2.

Cylindrical body 38 is a component formed in a substantially cylindrical shape. Cylindrical body 38 covers a periphery of shaft body 21 in a rotatable manner. More specifically, cylindrical body 38 includes axial through hole (hereinafter also referred to as a "cylindrical body through hole"). Shaft body 21 penetrates the cylindrical body through hole, and as a result, cylindrical body 38 covers the periphery of shaft body 21. The cylindrical body through hole is formed so as to have a size and a shape sufficient for rotation of shaft body 21 inserted from the second end side with low resistance or substantially no resistance. The size of the cylindrical body through hole may be such a size that shaft body 21 is fitted to the cylindrical body through hole with clearance fit left therebetween (engagement with clearance between shaft and hole).

Cylindrical body 38 is fixed to base 32. More specifically, cylindrical body 38 is fixed to the main surface of base 32 (one main surface) from which the second end of shaft body 21 protrudes, in such a position that the second end of shaft body 21 penetrating base 32 and protruding from base 32 is accommodated in the cylindrical body through hole. Cylindrical body 38 supports shaft body 21 penetrating disk tray 15 and extending toward the inner space of device body 10a in a stable manner. In this case, an axis of rotation of shaft body 21 (i.e., axis of turning of cover 20) is stabilized, wherefore cover 20 is allowed to turn in a plane substantially in parallel with the upper surface of device body 10a of disk drive device 10. Shaft body 21 may be made of a material containing metal as a main component, for example, or may be made of other materials.

Opening 38a is formed in a circumferential surface of cylindrical body 38. FIG. 3 illustrates an example of opening 38a having a substantially quadrangular shape constituted by two sides extending in a circumferential direction (hereinafter also abbreviated as a "left-right direction") of cylindrical body 38, and two sides extending in an axial direction (hereinafter also abbreviated as an "up-down direction") of cylindrical body 38. However, the shape of opening 38a is not limited to the specific example illustrated in FIG. 3 in any way. The shape, position, and size of opening 38a illustrated in FIG. 3 are presented only by way of example.

As illustrated in FIG. 3, a part of a side surface of shaft body 21 accommodated in the cylindrical body through hole of cylindrical body 38 is exposed through opening 38a. Shaft body 21 includes protrusion portion 22 fixed to the side surface exposed through opening 38a. Protrusion portion 22 is a columnar component made of a material containing metal as a main component, for example, or may be made of other materials. Protrusion portion 22 protrudes from the side surface while penetrating opening 38a. A protrusion length of this protrusion (length of protrusion portion 22) will be described below.

As described above, shaft body 21 is rotatable in a state that the second end is accommodated in cylindrical body 38. Protrusion portion 22 fixed to shaft body 21 similarly shifts (turns) in a circumferential direction of shaft body 21 (direction identical to left-right direction of cylindrical body 38, and hereinafter similarly abbreviated as a left-right direction) in accordance with rotation of shaft body 21. However, a movable range of protrusion portion 22 in the left-right direction is limited to a range of opening 38a. More specifically, the movable range of protrusion portion 22 in the left-right direction is limited to a range between both ends of opening 38a in the left-right direction (axial two sides included in four sides of substantially quadrangular shape of opening 38a in the example illustrated in FIG. 3). This configuration limits the movable range of rotation of shaft body 21.

In addition, a parallel shift of shaft body 21 is allowed in an axial direction (direction identical to up-down direction of cylindrical body 38, and hereinafter similarly abbreviated as an up-down direction) in a state that the second end is accommodated in cylindrical body 38. Protrusion portion 22 also shifts upward and downward in accordance with the upward and downward shift of shaft body 21. In this case, a movable range of protrusion portion 22 in the up-down direction is limited to the area of opening 38a similarly to the turning described above. More specifically, the movable range of protrusion portion 22 in the up-down direction is limited to a range between both ends of opening 38a in the up-down direction (circumferential two sides included in four sides of substantially quadrangular shape of opening 38a in the example illustrated in FIG. 3). This configuration limits the movable range of shaft body 21 in the up-down direction.

As described above, protrusion portion 22 is fixed to shaft body 21, wherefore a relative positional relationship between protrusion portion 22 and shaft body 21 is kept unchanged. In this case, movement of protrusion portion 22 and movement of shaft body 21 are linked with each other. Accordingly, the movable range of shaft body 21 can be limited by a limit of the movable range of protrusion portion 22. In addition, cover 20 is fixed to shaft body 21, wherefore a relative positional relationship between cover 20 and shaft body 21 is kept unchanged. In this case, movement of shaft body 21 and movement of cover 20 are linked with each other. Accordingly, the movable range of cover 20 can be limited by a limit of the movable range of shaft body 21. In other words, movement of protrusion portion 22 and movement of cover 20 are linked with each other, wherefore the movable range of cover 20 can be limited by a limit of the movable range of protrusion portion 22. As described above, the movable range of cover 20 is limited to a fixed range by the presence of opening 38a limiting the movable range of protrusion portion 22. Cylindrical body 38 including opening 38a thus configured is an example of a limitation portion according to this exemplary embodiment.

In other words, the movable range of cover 20 is determined by the shape, size, and position of opening 38a limiting the movable range of protrusion portion 22. More specifically, the range of turning of cover 20 around shaft body 21 is determined in correspondence with the position and size of opening 38a in the left-right direction in cylindrical body 38. For allowing turning of cover 20 between the cover closing position and the cover opening position, opening 38a is formed such that cover 20 is located at the cover closing position when protrusion portion 22 is at one end of the movable range in the left-right direction, and that cover 20 is located at the cover opening position when protrusion portion 22 is at the other end of the movable range in the left-right direction. In other words, cylindrical body 38 limits a turnable angle of protrusion portion 22 to a fixed range to thereby limit a rotation angle of shaft body 21 to a fixed range such that cover 20 turns between the cover opening position and the cover closing position.

In addition, a difference between upper and lower positions of cover 20 in the range between the cover closing position and the cover opening position is within a range of the size of opening 38a in the up-down direction in cylindrical body 38. In this way, cylindrical body 38 corresponding to an example of the limitation portion performs a function for limiting the turnable angle of protrusion portion 22 to a fixed range by the presence of opening 38a, as well as a function for supporting shaft body 21. Accordingly, turning mechanism 30 is capable of stopping cover 20 at an appropriate cover closing position and an appropriate cover opening position by using a relatively small number of parts.

Rotation cover 40 is a component formed in a substantially cylindrical shape. Rotation cover 40 includes an axial through hole (hereinafter also referred to as a "rotation cover through hole"). Rotation cover 40 is attached to cylindrical body 38 such that cylindrical body 38 penetrates the rotation cover through hole. However, rotation cover 40 is not fixed to cylindrical body 38 nor base 32. The rotation cover through hole is formed so as to have a size and a shape sufficient for rotation of rotation cover 40 relative to cylindrical body 38 with low resistance or substantially no resistance in a state that rotation cover 40 is attached to cylindrical body 38. The size of the rotation cover through hole may be such a size that cylindrical body 38 is fitted to rotation cover 40 with clearance fit.

In a state of assembly of turning mechanism 30, the position of rotation cover 40 in an axial direction of rotation cover 40 (direction identical to up-down direction of cylindrical body 38 and the like, and hereinafter similarly abbreviated as an up-down direction) is fixed by shaft body cover 36, and therefore is not movable in the up-down direction. Rotation cover 40 may be made of a material containing resin as a main component, for example, or may be made of other materials such as metal.

Rotation cover 40 has, on its circumferential surface, opening 40a elongated in the up-down direction. A size (length) of opening 40a in the up-down direction is so determined as to become substantially equivalent to the size of opening 38a formed in cylindrical body 38 in the up-down direction. A size (width) of opening 40a in a circumferential direction (direction identical to the left-right direction of cylindrical body 38 and the like, and hereinafter similarly abbreviated as a left-right direction) is so determined as to become slightly larger than a diameter of protrusion portion 22 (to such a degree that protrusion portion 22 is allowed to penetrate, and that a small clearance is produced between opening 40a and protrusion portion 22). This clearance forms play to allow a shift of protrusion portion 22 in the up-down direction with low resistance or substantially no resistance. In a state that rotation cover 40 is attached to cylindrical body 38, protrusion portion 22 protruding from opening 38a of cylindrical body 38 further protrudes through opening 40a of rotation cover 40.

According to turning mechanism 30 thus configured, rotation of rotation cover 40 and movement of protrusion portion 22 in the left-right direction are linked with each other. More specifically, with movement of protrusion portion 22 leftward and rightward, rotation cover 40 is pressed by protrusion portion 22 penetrating opening 40a and similarly rotates. However, with movement of protrusion portion 22 upward and downward, protrusion portion 22 only shifts upward and downward within opening 40a and does not move rotation cover 40 upward and downward.

The movable range of rotation cover 40 is determined in accordance with the movable range of protrusion portion 22 in the left-right direction. On the other hand, rotation of rotation cover 40 changes by application of external force to rotation cover 40, protrusion portion 22 follows this change unless force resisting this external force acts on protrusion portion 22. For example, when a rotation speed of rotation cover 40 changes by application of external force, a speed of leftward and rightward movement of protrusion portion 22 changes accordingly. Turning mechanism 30 may further include this type of mechanism for applying external force to rotation cover 40. Two examples of this type of mechanism are hereinafter described.

[1-2-1-2. Urging Mechanism and Speed Reduction Mechanism]

One of the two examples is an urging mechanism. Rotation cover 40 may include turning portion 40b disposed at a position slightly apart from the circumferential surface of rotation cover 40. Turning portion 40b protrudes upward, and has a fixed relative positional relationship with rotation cover 40. An end of one of arms of rotational urging spring 34 is fixed to turning portion 40b. An end of the other arm of rotational urging spring 34 is directly or indirectly fixed to upper housing 100. According to the example illustrated in FIGS. 2 and 3, the end of the other arm of rotational urging spring 34 is fixed to fixing portion 32b protruding upward from base 32. In other words, the end of the other arm of rotational urging spring 34 is fixed to upper housing 100 via fixing portion 32b by engagement.

As described above, the relative positional relationship between turning portion 40b and rotation cover 40 is fixed. Accordingly, turning of turning portion 40b and rotation of rotation cover 40 are linked with each other. Urging force generated by elasticity of rotational urging spring 34 is applied to rotation cover 40 via turning portion 40b. Rotational urging spring 34 is constituted of a reverse spring. Accordingly, rotational urging spring 34 can urge rotation cover 40 in a fixed range within the movable range of rotation of rotation cover 40 either in the left direction or the right direction of rotation cover 40. This range of urging is hereinafter referred to as an urging range. Rotational urging spring 34 may be constituted of components other than a torsion coil spring as long as the urging described above is achievable.

Turning mechanism 30 thus configured realizes following actions. It is assumed herein that an urging range is set at each of ends and vicinities of the ends of the movable range of rotation of rotation cover 40, for example. A range between the two urging ranges is hereinafter referred to as an intermediate range.

Initially, force at a level not generating momentum is applied by a hand of a user or the like to protrusion portion 22 located at one end of the movable range in a turnable direction, to move protrusion portion 22. When application of this force is discontinued in a state that protrusion portion 22 lies at a position in the intermediate range in excess of the urging range around the original end position, protrusion portion 22 stops at the corresponding position. Protrusion portion 22 is further pressed in a direction approaching the other end of the movable range until a position in excess of the intermediate range to rotate rotation cover 40 to the foregoing urging range, whereat application of the force to protrusion portion 22 is discontinued. As a result, urging force generated by rotational urging spring 34 is applied to turning portion 40b of rotation cover 40 via turning portion 40b, whereby rotation cover 40 is kept rotating in the same direction and reaches the other end of the movable range. In this stage, rotation cover 40 presses protrusion portion 22 to turn protrusion portion 22. Accordingly, shaft body 21 linked with turning protrusion portion 22 rotates in accordance with turning of protrusion portion 22, whereby cover 20 linked with shaft body 21 turns accordingly. Shaft body 21 is thus given rotational force from rotational urging spring 34 to turn cover 20 to the end of the movable range. A similar action is achievable in the opposite direction.

Force generated by elasticity of rotational urging spring 34 functions not only as force for urging rotational movement of rotation cover 40. For example, this force also acts as resistance force when rotation cover 40 located at one end of rotation limit positions (any one of left and right ends of movable range) is about to start rotation toward the other end in the state that the foregoing urging range has been set. This resistance force can reduce shifting or swinging of rotation cover 40 in the rotation direction even when force at a level generating slight vibration is given to rotation cover 40 located at the limit position from surroundings, for example. Rotation cover 40 located at the limit position starts rotation when pressed in the rotatable direction by force exceeding the resistance force. Rotation cover 40 further pressed by the force exceeding urging force (resistance force) passes through the urging range and enters the intermediate range. In this condition, rotation cover 40 is not pressed back to the position before movement, and therefore can stop at any position within the intermediate range. When rotation cover 40 kept pressed exceeds the intermediate range and enters the other urging range, rotation cover 40 is urged in the rotation direction and stops at the other limit position.

As described above, rotational urging spring 34 generates and applies force to rotation cover 40 for resisting movement in the rotation direction at the start of movement, and force for urging movement in the shift direction when rotation cover 40 exceeds a predetermined position (intermediate range), in either of a shift of rotation cover 40 from the one end of the movable range to the other end, or a shift of rotation cover 40 from the other end of the movable range to the one end.

The other one of the two examples described above is constituted of a speed reduction mechanism. For example, flange 40c surrounding rotation cover 40 may be provided at an end of rotation cover 40 (base 32 side end of rotation cover 40 attached to cylindrical body 38). Gear 40d is provided on at least a part of a base 32 side circumference of flange 40c. On the other hand, damper 33 equipped with gear 33a is provided on base 32. Gear 40d is brought into engagement with gear 33a. This engagement can reduce the rotation speed of rotation cover 40 to a predetermined range within the movable range of rotation cover 40. This reduction range is hereinafter referred to as a speed reduction range.

According to turning mechanism 30, this speed reduction mechanism may be used in combination with the urging mechanism described above. It is assumed herein that two urging ranges are set for turning mechanism 30 as described above, and that a speed reduction range is set in one of the urging ranges in a portion including one end of the movable range of rotation cover 40, for example. In this case, when the rotation position of rotation cover 40 comes into the urging range including the speed reduction range from a position out of the urging range, rotation cover 40 is initially urged toward the one end in the movable range by urging force generated by rotational urging spring 34. When the rotation position of rotation cover 40 subsequently enters the speed reduction range, the rotation speed decreases, whereby rotation cover 40 smoothly stops at the one end. Note that rotation cover 40 does not stop as a result of this speed reduction. Rotation cover 40 stops as a result of an arrival of protrusion portion 22 at an end of opening 38a of cylindrical body 38, and contact between protrusion portion 22 and cylindrical portion 38.

[1-2-2. Operation of Opening/Closing Mechanism]

According to the configuration of opening/closing mechanism 31 for cover 20 presented by way of example of the rotation cover, turning of cover 20 visible in the external appearance and rotation of rotation cover 40 of the internal mechanism are linked with each other via protrusion portion 22 and shaft body 21 as described above. Discussed herein is an overall operation of opening/closing mechanism 31, mainly movement of cover 20 and movement of rotation cover 40. It is assumed in this description that turning mechanism 30 includes an urging mechanism and a speed reduction mechanism having substantially the same configurations as those of the foregoing example.

An initial state assumed herein is such a state that cover 20 is located at the cover opening position. In this case, rotation cover 40 is positioned at one end of the movable range (one of limit positions at both ends of movable range), and kept pressed at that position by force generated by elasticity of rotational urging spring 34. Accordingly, cover 20 linked with rotation cover 40 stops at the cover opening position without movement in the rotation direction even when slight external force such as vibration and wind pressure is applied to cover 20.

It is assumed that cover 20 in this state is pressed by the hand of the user in the turnable direction, i.e., direction toward the cover closing position. This pressing force is transmitted to protrusion portion 22 via shaft body 21, and allows protrusion portion 22 to press rotation cover 40. When this pressing force exceeds the force generated by rotational urging spring 34 for keeping rotation cover 40 pressed at the limit position, cover 20 starts turning.

Rotation cover 40 rotates within the urging range in a period immediately after the start of turning of cover 20. More specifically, rotation cover 40 receives urging force generated by elasticity of rotational urging spring 34 and rotating rotation cover 40 in a direction returning to the original limit position. Accordingly, when the user releases the hand from cover 20 in this stage, cover 20 is pressed back to the cover opening position in accordance with rotation of rotation cover 40 in the direction returning to the original limit position as a result of the urging force.

It is assumed that the rotation position of rotation cover 40 enters the intermediate range in excess of the urging range with turning of cover 20 linked with rotation cover 40 by a further press of cover 20 by the hand of the user. In this case, the user is capable of stopping cover 20 at any position (any position within intermediate range) by releasing the hand from cover 20 at that position.

It is assumed that the rotation position of rotation cover 40 enters the other urging range in excess of the intermediate range with further turning of cover 20 linked with rotation cover 40 by a further press of cover 20 by the hand of the user or urging applied by the hand of the user. In this stage, rotation cover 40 receives urging force (i.e., urging force by user in rotation direction) in the direction opposite to the direction of the urging force generated immediately after the start of turning of cover 20 by elasticity of rotational urging spring 34 corresponding to a reverse spring. Accordingly, when the user releases the hand from cover 20, cover 20 in this stage turns in the direction (i.e., direction toward cover closing position) opposite to the direction for pressed back to the cover opening position in linkage with rotation of rotation cover 40 generated by the urging force. As a result, cover 20 turns toward the cover closing position even when urging applied by the hand of the user in the intermediate range is not sufficient for shifting cover 20 to the cover closing position.

The rotation position of rotation cover 40 enters the speed reduction range in the middle of rotation of rotation cover 40 caused by this urging force. As described above, the rotation speed of rotation cover 40 lowers in the speed reduction range. The turning speed of cover 20 linked with rotation cover 40 similarly lowers.

Rotation cover 40 further continuing rotation by the urging force reaches the other end of the movable range (other limit position), and stops at this end. Cover 20 linked with rotation cover 40 similarly stops at the cover closing position.

Opening/closing mechanism 31 performs an operation similar to the foregoing operation when cover 20 turns from the cover closing position to the cover opening position. Respective actions of opening/closing mechanism 31 performed when cover 20 turns from the cover closing position to the cover opening position are substantially the same as the corresponding actions described above, except that the direction of turning is opposite to the direction described above. Accordingly, detailed description of these actions is omitted herein.

As described above, the user using disk drive device 10 according to this exemplary embodiment need not manually shift cover 20 from the cover opening position to the cover closing position, or from the cover closing position to the cover opening position to open or close cover 20. Accordingly, the user is capable of opening or closing cover 20 by a smaller number of actions in comparison with a configuration requiring a manual shift by the user for all the actions.

Note that opening/closing mechanism 31 needs to be disposed on upper housing 100 in such a position that the stop position of cover 20 is aligned with the cover closing position. As described above, the cover closing position is defined in such a position that cover 20 covers whole disk tray 15 in the plan view of the upper surface of disk drive device 10.

However, the cover closing position may be more strictly defined in consideration of design quality, for example. A following position is one of examples of such a cover closing position. The cover closing position may be defined at such a position that a line connecting an axis of turning of cover 20 (axis of rotation of shaft body 21) and a point located on circular cover 20 and positioned farthest from the axis of turning is aligned with a line connecting the axis of turning of cover 20 and a point located on opening portion 11 and positioned farthest from the axis of turning, in the plan view of cover 20 at the cover closing position as viewed from the upper surface of disk drive device 10. In this case, respective components need to be manufactured and assembled with high engineering accuracy to define the cover closing position determined as above for disk drive device 10. However, a high yield rate is difficult to maintain when all of the components increasing in number are required to have high accuracy. In this case, manufacturing costs of disk drive device 10 may increase.

According to a rotation cover like cover 20 presented by way of example in this exemplary embodiment, slight errors of components around shaft body 21 may appear as noticeable deviation at the farthest position in cover 20. This deviation does not cause problems for practical use, but may deteriorate the appearance. According to this exemplary embodiment, strict definition of an appropriate cover closing position is realizable by using a configuration and a method different from those increasing component and assembly accuracy. The configuration and method according to this exemplary embodiment are hereinafter described.

[1-2-3. Configuration and Method for Determining Appropriate Cover Closing Position]

As described above, protrusion portion 22 is located at one end of the movable range in the left-right direction when cover 20 is at the cover closing position. The movable range of protrusion portion 22 in the left-right direction is limited between both the left and right ends of opening 38a of cylindrical body 38 corresponding to an example of the limitation portion. More specifically, the cover closing position of cover 20 is determined by a point located at either the left or right end of opening 38a and corresponding to the cover closing position of cover 20. Accordingly, the cover closing position of cover 20 is disposed at an appropriate position when the point at the corresponding end of opening 38a is determined at an appropriate position.

As illustrated in FIG. 3, four screw holes 39 are formed in base 32 to attach base 32 to upper housing 100. Each of screw holes 39 has not a circular shape, but such a shape which follows a circular arc formed by connecting points located at a fixed distance from an axis of the cylindrical body through hole (indicated by alternate long and short dash line in FIG. 3) fixed to base 32. More specifically, each shape of screw holes 39 is broad-bean-shaped in the plan view of base 32 viewed from above. Distances between the cylindrical body through hole and respective screw holes 39 need not be uniform. This configuration realizes following actions. Initially, base 32 is disposed at an installation position in upper housing 100. Subsequently, screw 39a is half-tightened into each of screw holes 39 for temporary fixation between base 32 and upper housing 100. In this state, base 32 is allowed to rotate around an axis of the cylindrical body through hole in accordance with a circular-arc length of each screw hole 39. In this case, the left-right position of opening 38a of cylindrical body 38 fixed to base 32 is changeable in accordance with this rotation of base 32.

Procedures of an adjustment method of the cover closing position of cover 20 based on the foregoing configuration are now described with reference to FIG. 4.

Figure 4:
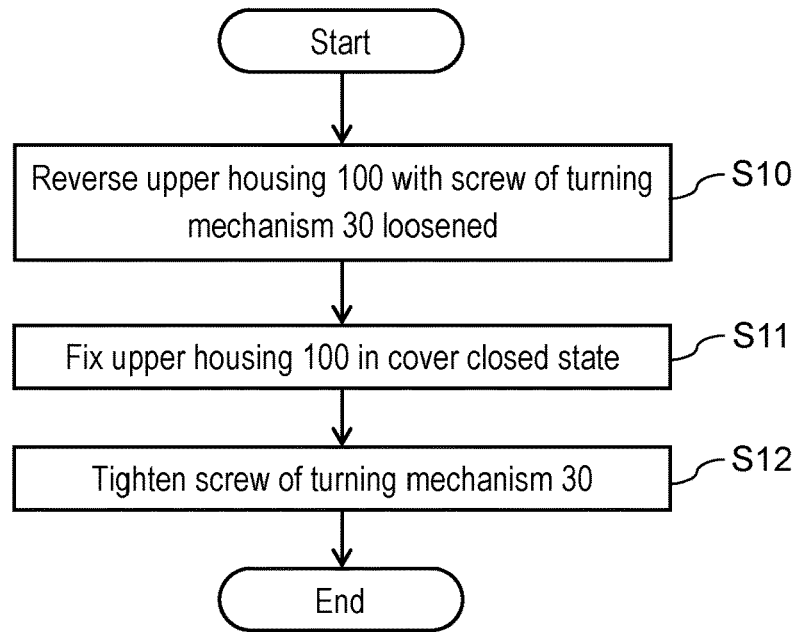
FIG. 4 is a flowchart illustrating an example of procedures for adjustment of a cover closing position of a cover at the time of assembly of the disk drive device according to the first exemplary embodiment.

FIG. 4 is a flowchart illustrating an example of procedures for adjustment of the cover closing position of cover 20 at the time of assembly of disk drive device 10 according to the first exemplary embodiment. It is assumed that upper housing 100 includes disk tray 15, and temporarily assembled cover 20, shaft body 21, and turning mechanism 30, in an initial state for execution of the procedures. Note that shaft body cover 36 of turning mechanism 30 is not attached to base 32 in this assumption.

Initially, upper housing 100 is reversed in a state that screws 39a (screws 39a penetrating screw holes 39) for fixing turning mechanism 30 to upper housing 100 are loosened (step S10). More specifically, upper housing 100 is positioned such that the inner surface faces upward, and the surface to which cover 20 is attached faces downward, in a state that turning mechanism 30 is temporarily fixed to upper housing 100. In the state that base 32 is temporarily fixed to upper housing 100, fine adjustment of the position of base 32 with respect to upper housing 100 is allowed. Note that a possibility of separation of shaft body 21 from upper housing 100, and a resultant drop of cover 20 is lowered by engagement between protrusion portion 22 and opening 38a. The turning range of protrusion portion 22 is limited to the area of opening 38a, in which condition cover 20 is turnable with respect to upper housing 100 in linkage with the turning range of protrusion portion 22.

Subsequently fixed are relative positions of cover 20 and upper housing 100 with adjustment of the relative positions of cover 20 and upper housing 100 such that cover 20 is disposed at an appropriate position (such as cover closing position described above) with respect to upper housing 100 (or disk tray 15) (step S11). More specifically, a jig (adjustment tool for determining desired cover closing position) is set on a work table prepared for the series of procedures to define the positional relationship between cover 20 and upper housing 100. Thereafter, upper housing 100 to which cover 20 is attached is set on the jig.

While maintaining this state of cover 20 and upper housing 100, the position of base 32 is finely adjusted such that protrusion portion 22 comes into contact with cylindrical body 38 at a position corresponding to the cover closing position of cover 20 at either the left or right end of opening 38a. After the fine adjustment, turning mechanism 30 is fixed to upper housing 100 by tightening loosened respective screws 39a while fixing base 32 at the adjusted position (step S12). When protrusion portion 22 is not in contact with cylindrical body 38 in this step, the position of base 32 is adjusted (rotated) until contact between protrusion portion 22 and cylindrical body 38 before tightening of respective screws 39a.

Turning mechanism 30 located inside disk drive device 10 is capable of stopping cover 20 at an appropriate cover closing position based on adjustment of the position (position in left-right direction) of opening 38a of cylindrical body 38 corresponding to an example of the limitation portion by the use of the configuration and method described above. In addition, the position of base 32 is finely adjustable even when sizes of respective components of opening/closing mechanism 31 of cover 20 contain errors from target values. Accordingly, these errors are allowed within an adjustable range.

Note that the adjustment procedures described above are presented by way of example. The cover closing position of cover 20 may be determined at an appropriate position by procedures different from the foregoing adjustment procedures. For example, an appropriate cover closing position may be determined based on following procedures by using the jig described above in an assembly step.

Initially, shaft body 21 fixed to cover 20 is faced upward, in which condition cover 20 is set on the jig. Upper housing 100 reversed in the up-down direction is set on the jig such that shaft body 21 passes through the hole of disk tray 15. Base 32 to which cylindrical body 38 is fixed is set such that shaft body 21 protruding from upper housing 100 enters the base through hole and leaves the cylindrical body through hole. Rotation cover 40 is attached to cover cylindrical body 38. Protrusion portion 22 inserted through openings 40*a* and 38*a* is fixed to shaft body 21. Base 32 is rotated until contact between protrusion portion 22 and cylindrical body 38. Finally, screws 39*a* are tightened into corresponding screw holes 39 while maintaining this contact state. As a result, turning mechanism 30 can be fixed to upper housing 100 with adjustment of the position of turning mechanism 30 such that cover 20 stops at an appropriate cover closing position in the assembly step of disk drive device 10.

Note that the number of screw holes 39 formed in base 32 is not limited to four. The minimum number of screw holes 39 formed in base 32 may be set to three for stable fixation of base 32 to upper housing 100. In addition, the number of screw holes 39 formed in base 32 may be increased to five or more as necessary, in consideration of balance between strength required for fixation of base 32 to upper housing 100, and costs required for components and assembly work. The shape of each screw hole 39 (broad-bean shape) described above is presented only by way of example. The shape or size of each screw hole 39 may be appropriately determined in accordance with a positional adjustment direction and an adjustment volume required for stopping cover 20 at an appropriate cover closing position at the time of adjustment of the relative positions of base 32 and upper housing 100.

According to the adjustment procedures described above, the adjustment target is not the cover opening position, but only the cover closing position. According to disk drive device 10 of this exemplary embodiment, no reference is specified for the cover opening position unlike the cover closing position specified by opening portion 11. Accordingly, strictness for the cover opening position is unnecessary, unlike the cover closing position.

On the other hand, securing of a space (clearance) sufficient for attachment and detachment of a recording medium between cover 20 and disk tray 15 is required at the time of determination of the cover opening position. For example, opening/closing mechanism 31 may be configured such that cover 20 turns through approximately 180 degrees from the cover closing position in disk drive device 10 equipped with cover 20 corresponding to an example of the rotation cover. This configuration can meet the foregoing requirement for the attachment and detachment space. According to disk drive device 10 thus configured, however, the turning range of cover 20 becomes relatively wide. Accordingly, a space for turning of cover 20 needs to be secured on the rear of disk drive device 10 at the time of installation of disk drive device 10 so as to prevent collision between turning cover 20 and surrounding objects.

According to this exemplary embodiment, a turning angle of cover 20 is set to an angle smaller than 180 degrees to prevent enlargement of the space required for installing disk drive device 10. As described above, according to this exemplary embodiment, opening/closing mechanism 31 is configured such that a clearance (distance in the up-down direction) between the lower surface of cover 20 and the upper surface of device body 10*a* of disk drive device 10 (circumferential edge of disk tray 15) when cover 20 is located at the cover opening position becomes longer than that when cover 20 is located at the cover closing position. This configuration of disk drive device 10 secures the clearance between cover 20 at the cover opening position and disk tray 15.

Described next is a configuration which produces a difference between the distance (distance in the up-down direction) from the upper surface of device body 10*a* (circumferential edge of disk tray 15) to cover 20 at the cover closing position, and the distance (distance in the up-down direction) from the upper surface of device body 10*a* (circumferential edge of disk tray 15) to cover 20 at the cover opening position (the difference is hereinafter also referred to as a "height difference").

[1-2-4. Configuration Producing Height Difference between Cover Closing Position and Cover Opening Position]

As described above, movement of protrusion portion 22 and movement of cover 20 are linked with each other in opening/closing mechanism 31. Accordingly, the position of cover 20 in the up-down direction is changeable by changing the position of protrusion portion 22 in the up-down direction. More specifically, cover 20 shifts upward and downward by shifting protrusion portion 22 upward and downward within the range of opening 38*a* corresponding to the movable range. According to this exemplary embodiment, opening/closing mechanism 31 is configured to shift turning protrusion portion 22 upward and downward. This configuration produces a height difference between cover 20 at the cover closing position and cover 20 at the cover opening position.

Figure 5:
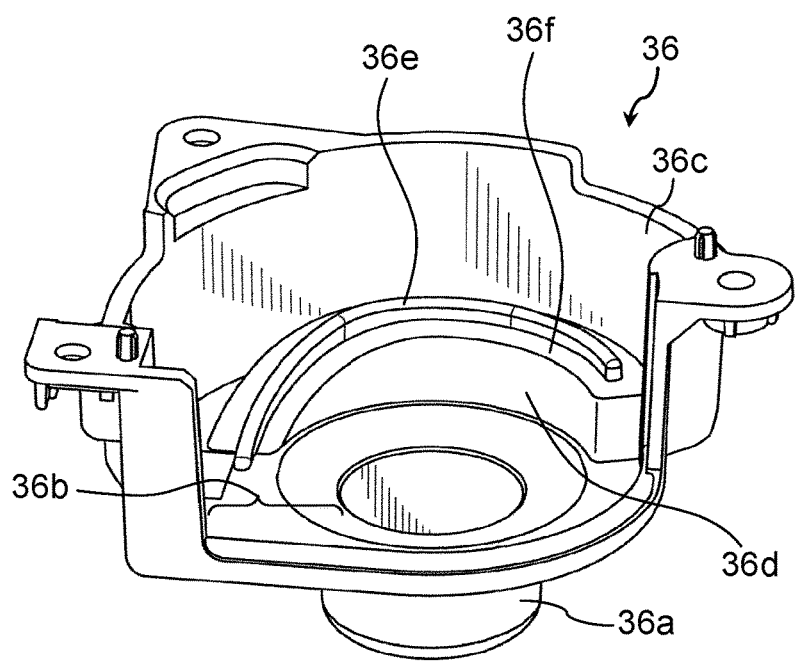
FIG. 5 is a perspective view schematically illustrating an example of a shaft body cover included in the disk drive device according to the first exemplary embodiment.

FIG. 5 is a perspective view schematically illustrating an example of shaft body cover 36 included in disk drive device 10 according to the first exemplary embodiment. FIG. 5 illustrates shaft body cover 36 reversed in the up-down direction from the state illustrated in the exploded view of FIG. 3. Accordingly, FIG. 5 illustrates shaft body cover 36 substantially in the same posture as the posture of shaft body cover 36 disposed inside disk drive device 10 in an ordinary installation state.

As illustrated in FIG. 5, shaft body cover 36 includes bottom cylinder 36*a* disposed in a lowest part, flange 36*b* surrounding an upper end of bottom cylinder 36*a*, and circumferential wall 36*c* rising from a circumferential end of flange 36*b* except for a part thereof (front side in FIG. 5). Up-down guide 36*d* is further provided on an upper surface of flange 36*b*. Up-down guide 36*d* has a substantially sector shape and extends in a circumferential direction of flange 36*b* when shaft body cover 36 is viewed in the plan view from above, and rises from the upper surface of flange 36*b*. Up-down guide 36*d* is configured to shift turning protrusion portion 22 in the up-down direction. Up-down guide 36*d* includes upper surface 36*f* constituted by a slope surface, and is so shaped that a height of up-down guide 36*d* gradually increases from an end (left end in FIG. 5) toward the other end (right end in FIG. 5) in the circumferential direction of flange 36*b*. Upper surface 36*f* of up-down guide 36*d* corresponds to an example of a slope portion according to this exemplary embodiment. Shaft body cover 36 may be made of a material containing resin as a main component, for example, but may be made of other materials such as metal.

Described next is a relationship between respective parts of shaft body cover 36, and other components of turning mechanism 30 which includes shaft body cover 36 assembled as a part of turning mechanism 30.

Bottom cylinder 36*a* accommodates an end portion of cylindrical body 38 penetrating rotation cover 40. As described above, the end portion of cylindrical body 38 accommodates the second end of shaft body 21. Shaft body 21 corresponding to an axis of turning of cover 20 in turning mechanism 30 extends upward from an interior of bottom cylinder 36*a*, and penetrates the base through hole and disk tray 15 to be fixed to cover 20 on the first end side. Shaft body cover 36 is therefore configured to cover a substantially entire part of shaft body 21 located below base 32.

An end surface of rotation cover 40 on the side not provided with gear 40d (upper end surface in FIG. 3) is disposed in the vicinity of bottom cylinder 36a of flange 36b.

A portion not provided with circumferential wall 36c at a circumferential end of flange 36b forms an opening between flange 36b and base 32. The arm of rotational urging spring 34 on the side fixed to turning portion 40b of rotation cover 40 passes through this opening.

On the other hand, a substantially sectorial range in which up-down guide 36d is provided on flange 36b is substantially equivalent to the movable range (movable range in left-right direction) of the end portion of protrusion portion 22 in the plan view of shaft body cover 36 viewed from above. When protrusion portion 22 is disposed within the movable range, a lower part of the end portion of protrusion portion 22 comes into contact with upper surface 36f of up-down guide 36d. In other words, turning protrusion portion 22 slides on upper surface 36f of up-down guide 36d. The position of the left end of up-down guide 36d in FIG. 5 is substantially aligned with the position of the end portion of protrusion portion 22 when cover 20 is located at the cover closing position. The position of the right end of up-down guide 36d in FIG. 5 is substantially aligned with the position of the end portion of protrusion portion 22 when cover 20 is located at the cover opening position.

The length of protrusion portion 22 is determined such that the vicinity of the end of protrusion portion 22 is carried on up-down guide 36d, and that the end of protrusion portion 22 does not reach (come into contact with) circumferential wall 36c when shaft body cover 36 is assembled as a part of turning mechanism 30.

According to turning mechanism 30 including up-down guide 36d thus configured, protrusion portion 22 shifting (turning) from the left to the right in FIG. 5 moves along upper surface 36f of up-down guide 36d while gradually shifting upward (rising). Cover 20 linked with movement of protrusion portion 22 in this stage gradually shifts upward (rises) while shifting (turning) from the cover closing position to the cover opening position. According to this exemplary embodiment, therefore, turning protrusion portion 22 shifts along upper surface 36f of up-down guide 36d corresponding to a slope to produce the height difference between cover 20 at the cover closing position and cover 20 at the cover opening position.

With reference to FIGS. 6A and 6B, a description is given of a positional relationship between protrusion portion 22 and up-down guide 36d when cover 20 is located at the cover closing position, the corresponding positional relationship at the cover opening position, and a change of the positional relationship produced between the respective positions.

FIG. 6A is a perspective view schematically illustrating an example of the positional relationship between protrusion portion 22 and up-down guide 36d when cover 20 is located at the cover closing position in disk drive device 10 according to the first exemplary embodiment. FIG. 6B is a perspective view schematically illustrating an example of the positional relationship between protrusion portion 22 and up-down guide 36d when cover 20 is located at the cover opening position in disk drive device 10 according to the first exemplary embodiment. In each of FIGS. 6A and 6B, an upper figure is a perspective view generally illustrating the whole of turning mechanism 30. An arrow in each of the figures indicates a turning direction of cover 20. On the other hand, a lower figure in each of the figures is a perspective view illustrating an enlarged area surrounded by a broken line in the corresponding upper figure. The respective figures do not show parts not relating to following description in the respective parts of shaft body cover 36, such as a part of circumferential wall 36c, for easy visual understanding.

Discussed by way of example is an operation of opening/closing mechanism 31 performed when cover 20 turns from the cover closing position to the cover opening position (i.e., when cover 20 shifts from state illustrated in FIG. 6A to state illustrated in FIG. 6B).

As illustrated in FIG. 6A, protrusion portion 22 is disposed at the lowest position or around this position of upper surface 36f of up-down guide 36d when cover 20 is located at the cover closing position. At this time, protrusion portion 22 is disposed at the lowest position or around this position of opening 40a of rotation cover 40 (arch portion at upper end of opening 40a in FIG. 3). This position corresponds to the lowest position in the movable range of protrusion portion 22. Accordingly, cover 20 linked with protrusion portion 22 is similarly disposed at the lowest position in the movable range of cover 20 in the up-down direction when protrusion portion 22 is located at the position indicated in FIG. 6A.

When cover 20 starts turning from the cover closing position to the cover opening position, protrusion portion 22 starts turning in accordance with the turning of cover 20, and initially comes into contact with upper surface 36f of up-down guide 36d. Protrusion portion 22 subsequently slides on upper surface 36f of up-down guide 36d. During continuation of turning of protrusion portion 22, upper surface 36f of up-down guide 36d gradually guides turning protrusion portion 22 upward. As a result, shaft body 21 linked with protrusion portion 22 gradually rises with protrusion portion 22, whereby cover 20 fixed to shaft body 21 gradually rises together with shaft body 21 while turning toward the cover opening position.

When protrusion portion 22 reaches a limit position of the turning range in the left-right direction or the up-down direction, protrusion portion 22 comes to a vicinity of the end of upper surface 36f of up-down guide 36d on the side opposite to the position prior to the turning start as illustrated in FIG. 6B. At this time, protrusion portion 22 is located at the highest position in the movable range. Accordingly, cover 20 linked with protrusion portion 22 is also located at the highest position in the movable range of cover 20 in the up-down direction when protrusion portion 22 is located at the position indicated in FIG. 6B.

When cover 20 turns from the cover opening position to the cover closing position (i.e., when cover 20 shifts from state in FIG. 6B to state in FIG. 6A), each of cover 20, shaft body 21, and protrusion portion 22 performs an action in the direction opposite to the direction of the action described above. More specifically, protrusion portion 22 gradually lowers along upper surface 36f of up-down guide 36d while turning in the direction opposite to the foregoing direction. Cover 20 gradually lowers together with shaft body 21 while turning toward the cover closing position.

As described above, the shift performed by cover 20 according to this exemplary embodiment is not a shift only in the up-down direction, but such a shift that any point in cover 20 (excluding point on the axis of turning of cover 20) moves in a substantially spiral shape in accordance with turning of cover 20.

The movable range of protrusion portion 22 is limited to the area of opening 38a, wherefore the height difference of up-down guide 36d may be determined in correspondence with the size (height) of the movable range of protrusion portion 22 in the up-down direction. More specifically, a remainder of subtraction of the height of protrusion portion 22 within opening 38a from the height of opening 38a may be determined as a limit of the height difference of the up-down guide 36d. The height difference of up-down guide 36d corresponds to a height difference between the cover closing position and the cover opening position of cover 20. Accordingly, the height difference of up-down guide 36d may be determined in consideration of specifications of respective components, such as a turning angle of cover 20 and a depth of disk tray 15, easiness of attachment and detachment of a recording medium, and others. For example, according to opening/closing mechanism 31 of this exemplary embodiment, the turning angle of cover 20 from the cover closing position to the cover opening position is set to approximately 135 degrees, while a rising distance of cover 20 from the cover closing position to the cover opening position is set to approximately 7.5 millimeters. These numerical values are presented only by way of example. Respective values according to the present disclosure are not limited to these specific values in any way.

As illustrated in FIG. 5, up-down guide 36d may include circular-arc-shaped rail 36e at a position of contact between upper surface 36f and protrusion portion 22. Rail 36e can relatively decrease frictional force between up-down guide 36d and protrusion portion 22 by reduction of a contact area therebetween while securing rigidity of up-down guide 36d. Accordingly, force required for turning of cover 20 can relatively decrease.

The shapes of up-down guide 36d and rail 36e are not limited to the shapes illustrated in the figures. Each of the shapes of up-down guide 36d and rail 36e may be selected from various types of shapes, such as a shape having a triangular or arch cross-sectional shape in a radial direction of the circular arc, or a shape constituted by a lower surface (surface contacting flange 36b) having a relatively large area, and an upper surface (surface contacting protrusion portion 22) having a relatively small area. However, protrusion portion 22 is difficult to stop in the middle of turning (position between cover closing position and cover opening position) when the frictional force between protrusion portion 22 and up-down guide 36d becomes excessively small. Accordingly, up-down guide 36d, rail 36e, or protrusion portion 22 may be configured such that appropriate frictional force is generated between protrusion portion 22 and up-down guide 36d to allow cover 20 to stop at a position where the user releases the hand in the middle of turning of cover 20 caused by a press with the hand of the user.

The foregoing configuration of turning mechanism 30 can achieve not only formation of the clearance described above, but also simplification of an operation performed by the user.

For example, the disk drive device disclosed in PTL 1 requires a user to perform following two operations for closing the cover. The user initially presses the cover at the cover opening position in the direction of the cover closing position to turn the cover to an end of a turning range of the cover. A shift of the cover in this stage is a shift in a plane parallel with a disk attached to the disk drive device. Subsequently, the user presses the cover toward the device body of the disk drive device to set the cover at the cover closing position. A shift of the cover in this stage is a shift in the direction perpendicular to the turning direction.

On the other hand, according to disk drive device 10 presented in this exemplary embodiment, the user is required to perform only following one operation for closing cover 20. More specifically, the user is only required to press cover 20 located at the cover opening position in the direction toward the cover closing position. Cover 20 pressed by the user turns from the cover opening position to the cover closing position. During turning of cover 20, protrusion portion 22 shifts diagonally downward along up-down guide 36d as described above, wherefore cover 20 linked with protrusion portion 22 similarly shifts diagonally downward.

Accordingly, disk drive device 10 can stop the rotation cover at an appropriate cover closing position without using a mechanism having the visually recognizable external appearance and deteriorating design quality, thereby simplifying operations can be performed by the user.

Second Exemplary Embodiment

Described in the first exemplary embodiment is a configuration example which determines an appropriate cover closing position by adjustment of the limitation portion provided inside disk drive device 10. In this case, adjustment of the cover closing position of cover 20 in disk drive device 10 is required at the time of assembly of disk drive device 10, or after removal of upper housing 100 from disk drive device 10 according to the first exemplary embodiment.

According to the configuration of the rotation cover presented in the first exemplary embodiment, however, slight errors of parts around shaft body 21 may appear as noticeable distortion at the farthest position in cover 20 as described above. Accordingly, cover 20 located at the cover closing position may shift from the original position after a start of use of disk drive device 10, when external force is applied to a periphery of cover 20, or when changes are produced in the parts around shaft body 21 due to abrasion or for other reasons, for example.

According to the configuration presented in the first exemplary embodiment, the jig or the like described above may be needed to return the cover closing position of shifted cover 20 to the original position. In addition, the jig or the like may be needed for re-adjustment of the cover closing position of cover 20 when turning mechanism 30 is temporarily removed from disk drive device 10 for repair or other reasons. It is preferable to constitute the turning mechanism of disk drive device 10 such that the relative positions of cover 20 and upper housing 100 are easily re-adjustable to appropriate positions without the use of the jig by the user or a repairer in view of improvement of user-friendliness and maintenance of disk drive device 10.

Described in a second exemplary embodiment is a configuration of a turning mechanism including a limitation portion which allows easy adjustment of the cover closing position of cover 20 to an appropriate position to be made from the outside of disk drive device 10 even after assembly of disk drive device 10.

[2-1. Turning Mechanism]

The second exemplary embodiment is hereinafter described with reference to FIG. 7.

Figure 7:
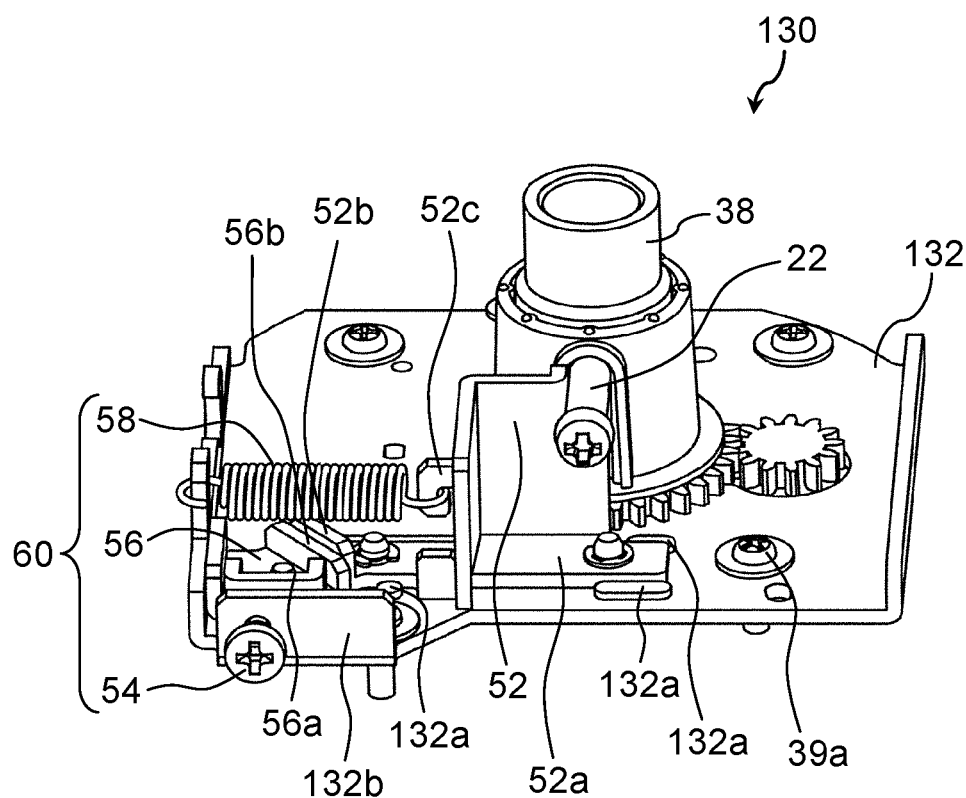
FIG. 7 is a perspective view schematically illustrating an example of a turning mechanism which includes a cover closing position adjuster according to a second exemplary embodiment.

FIG. 7 is a perspective view schematically illustrating an example of turning mechanism 130 including a cover closing position adjuster according to the second exemplary embodiment. In FIG. 7, constituent elements substantially identical to the corresponding constituent elements included in turning mechanism 30 presented in the first exemplary embodiment have been given similar reference numbers, and the same description is omitted. More specifically, protrusion portion 22 and cylindrical body 38 in this exemplary embodiment are substantially identical to protrusion portion 22 and cylindrical body 38 in the first exemplary embodiment. In addition, constituent elements illustrated in FIG. 7 but not relating to description of this exemplary embodiment are not given reference numbers, and description of these elements is omitted. A difference between base 132 according to this exemplary embodiment and base 32 shown in the first exemplary embodiment will be described below. FIG. 7 illustrates a perspective view of turning mechanism 130 attached to upper housing 100 of disk drive device 10 as viewed from the rear of disk drive device 10. FIG. 7 further indicates a position of protrusion portion 22 when cover 20 is located at a cover closing position. It is assumed that the disk drive device or an opening/closing mechanism (not illustrated) according to the second exemplary embodiment has a configuration substantially identical to disk drive device 10 or opening/closing mechanism 31 presented in the first exemplary embodiment except that turning mechanism 130 is provided in place of turning mechanism 30. Note that the directions of the left and right in the following description correspond to the directions of the left and right in FIG. 7, and are used only for convenience of simplification of the description.

As illustrated in FIG. 7, turning mechanism 130 according to this exemplary embodiment includes base 132, protrusion portion 22, and cylindrical body 38. Turning mechanism 130 further includes stopper 52 and cover closing position adjuster 60 on base 132. Each of stopper 52 and cover closing position adjuster 60 is a component made of a material containing metal as a main component, for example, but may be made of other materials. Each of stopper 52 and cover closing position adjuster 60 is an example of an element constituting the limitation portion according to this exemplary embodiment.

As illustrated in FIG. 7, stopper 52 contacts protrusion portion 22 when cover 20 is located at the cover closing position. Stopper 52 in contact with protrusion portion 22 turning in linkage with cover 20 determines a stop position of protrusion portion 22 when cover 20 is located at the cover closing position. Stopper 52 includes stopper leg portion 52a inside guide 132a included in base 132. Stopper 52 is slidable in the left-right direction in FIG. 7 along guide 132a. In addition, turning mechanism 130 is configured to be able to shift stopper 52 and fix stopper 52 at any position. Accordingly, a contact position between stopper 52 and protrusion portion 22 (i.e., stop position of protrusion portion 22 when cover 20 is located at the cover closing position) is adjustable. Cylindrical body 38 illustrated in FIG. 7 is substantially identical to cylindrical body 38 presented in the first exemplary embodiment, and includes opening 38a (not illustrated in FIG. 7). In this case, a movable range of protrusion portion 22 in the left-right direction adjustable by stopper 52 is limited to the movable range limited by opening 38a. Note that guide 132a limits a shift direction of stopper 52 only in the left-right direction in FIG. 7. Accordingly, stopper 52 does not shift in directions moving close to and away from the rear of disk drive device 10.

Described next is a configuration for shifting stopper 52 in the left-right direction, and fixing stopper 52 at a shifted position.

A left end of stopper leg portion 52a in FIG. 7 contacts cover closing position adjuster 60. This contact portion is pressed by cover closing position adjuster 60 from the left toward the right in FIG. 7 to press stopper 52 along guide 132a and shift stopper 52 toward the right. Stopper 52 includes stopper leg tab 52b disposed at the left end of stopper leg portion 52a and provided to secure the contact between stopper leg portion 52a and cover closing position adjuster 60. A configuration of cover closing position adjuster 60 for pressing stopper leg tab 52b will be described below.

Stopper 52 further includes hook 52c disposed on a side facing cover closing position adjuster 60. Force for pulling stopper 52 via hook 52c is constantly applied from cover closing position adjuster 60 to stopper 52. In this case, stopper 52 is attracted toward cover closing position adjuster 60, wherefore stopper leg tab 52b comes into constant contact with cover closing position adjuster 60. Accordingly, stopper 52 does not spontaneously shift in a direction away from cover closing position adjuster 60 (rightward in FIG. 7), but is fixed to the position at which stopper leg tab 52b contacts cover closing position adjuster 60.

Cover closing position adjuster 60 can shift stopper 52 toward the left in FIG. 7 along guide 132a by the force for pulling hook 52c. Stopper 52 is fixed to a shifted position. This action will be described below.

Next, a configuration example of cover closing position adjuster 60 is hereinafter described.

As illustrated in FIG. 7, cover closing position adjuster 60 includes screw 54, displacement transmitter 56, and slide urging spring 58.

Screw 54 is inserted from the outside of a rear plate (not illustrated) of disk drive device 10. A head of screw 54 is disposed outside the rear plate. Accordingly, the head of screw 54 is exposed to the outside of device body 10a of disk drive device 10. Base 132 includes base tab 132b disposed at a rear plate side end of base 132 and extending in parallel with the rear plate. The rear plate includes a hole (not illustrated) through which screw 54 is inserted (such a hole is not limited to a screw hole). Base tab 132b also includes, at substantially the same position as that of the hole of the rear plate, a screw hole through which screw 54 is inserted. A shaft of screw 54 (part other than head) is so inserted as to penetrate the hole formed in the rear plate, and the screw hole formed in base tab 132b in a direction substantially perpendicular to the rear plate from the outside of the rear plate. Accordingly, the insertion direction of screw 54 is a direction substantially perpendicular to the left-right direction corresponding to the shift direction of stopper 52.

Displacement transmitter 56 is disposed between a screw end of screw 54 and stopper leg tab 52b, and is so shaped as to contact each of the screw end of screw 54 and stopper leg tab 52b. Displacement transmitter 56 includes a displacement transmitter tab 56a provided to secure the contact between displacement transmitter 56 and the screw end of screw 54, and displacement transmitter tab 56b provided to secure the contact between displacement transmitter 56 and stopper leg tab 52b.

As illustrated in FIG. 7, stopper leg tab 52b is formed obliquely to the shift direction of stopper 52 (left-right direction in FIG. 7), while displacement transmitter tab 56b is formed obliquely to the insertion direction of screw 54. Stopper leg tab 52b and displacement transmitter tab 56b are formed in parallel with each other. Each of stopper leg tab 52b and displacement transmitter tab 56b has a flat surface in parallel with each other, and faces and makes contact with each other to produce surface contact with each other. Base 132 includes a guide (not illustrated) provided in parallel with the insertion direction of screw 54. Displacement transmitter 56 is slidable along this guide in the insertion direction of screw 54.

Slide urging spring 58 is a spring disposed in a posture expandable and contractible in the shift direction of stopper 52 (left-right direction in FIG. 7). One end of slide urging spring 58 is fixed to base 132, while the other end of slide urging spring 58 is fixed to hook 52c of stopper 52. Slide urging spring 58 applies pulling force to stopper 52 for pulling stopper 52 toward cover closing position adjuster 60 (left side in FIG. 7) in the shift direction of stopper 52. Accordingly, stopper 52 is constantly urged toward cover closing position adjuster 60.

[2-2. Action]

Actions of stopper 52 and cover closing position adjuster 60 are hereinafter described.

Initially discussed is an action of turning mechanism 130 performed when screw 54 is rotated in a tightening direction. With rotation of screw 54 in the tightening direction, the screw end of screw 54 is displaced in a direction of deep insertion, i.e., in a direction toward the inside of disk drive device 10 away from the rear plate of disk drive device 10. More specifically, with rotation of screw 54 in the tightening direction, the screw end of screw 54 is displaced in a direction for pressing displacement transmitter tab 56a to the inside of turning mechanism 130. As a result, displacement transmitter tab 56a pressed by the end portion of screw 54 is pressed toward the inside of turning mechanism 130, whereby whole displacement transmitter 56 shifts in a direction away from the rear plate.

With a shift of displacement transmitter 56 pressed toward the inside of turning mechanism 130, stopper leg tab 52b is pressed by displacement transmitter tab 56b. Displacement transmitter tab 56b corresponding to a part of displacement transmitter 56 shifts in a direction away from the rear plate. However, displacement transmitter tab 56b and stopper leg tab 52b are obliquely formed with respect to the respective shift directions as described above. Accordingly, the force pressing displacement transmitter 56 acts as force pressing stopper 52 in a direction away from the cover closing position adjuster 60 (rightward in FIG. 7) via displacement transmitter tab 56b and stopper leg tab 52b.

More specifically, the force for shifting displacement transmitter 56 away from the rear plate is transmitted from displacement transmitter tab 56b formed obliquely to the shift direction of displacement transmitter 56 to stopper leg tab 52b facing displacement transmitter tab 56b substantially in parallel and being in contact with displacement transmitter tab 56b. In this case, the original force is decomposed into force acting in the direction away from the rear plate, and force acting rightward. However, stopper 52 limited by guide 132a does not shift in the direction away from the rear plate even by application of the force acting in the direction away from the rear plate contained in the original force. On the other hand, the rightward force acts on stopper 52 and shifts stopper 52 toward the right. In this case, stopper leg tab 52b and displacement transmitter tab 56b being in contact with each other while facing substantially in parallel with each other via the flat surfaces of respective tabs 52b and 56b come to slide relative to each other.

The shift of the screw generated by rotation of screw 54 in the tightening direction is thus converted into a shift of stopper 52 (shift rightward in FIG. 7) by displacement transmitter 56.

An action of turning mechanism 130 when screw 54 is rotated in a loosening direction is hereinafter described. With rotation of screw 54 in the loosening direction, the screw end of screw 54 is displaced in a direction of a smaller amount of insertion, i.e., displaced in a direction approaching the rear plate from the inside of disk drive device 10. On the other hand, urging force in a direction approaching cover closing position adjuster 60 (leftward in FIG. 7) is constantly applied from slide urging spring 58 to stopper 52 as described above. This urging force acts as force pressing displacement transmitter 56 toward the rear plate. More specifically, this urging force acts on displacement transmitter 56 via stopper leg tab 52b and displacement transmitter tab 56b, as force for shifting displacement transmitter 56 in the direction approaching the rear plate. Accordingly, with rotation of screw 54 in the loosening direction, the screw end of screw 54 is displaced in the direction approaching the rear plate, in which condition displacement transmitter 56 approaches the rear plate while following the screw end of screw 54 by the force corresponding to the urging force of slide urging spring 58. In this case, stopper 52 shifts in the direction approaching cover closing position adjuster 60 (leftward in FIG. 7) in accordance with these actions.

According to the configuration described above, turning mechanism 130 can change the left-right position of stopper 52 inside device body 10a of disk drive device 10 in accordance with rotation of screw 54 exposed to the outside of device body 10a of disk drive device 10. Accordingly, the position of stopper 52 in device body 10a is adjustable such that cover 20 stops at an appropriate cover closing position (i.e., turning protrusion portion 22 stops by contact between protrusion portion 22 and stopper 52 at appropriate cover closing position of cover 20). According to disk drive device 10 including the limitation portion thus configured, a dedicated tool such as the jig described above is not required for adjustment of the cover closing position. Accordingly, even when cover 20 is deviated from an appropriate cover closing position after a start of use of disk drive device 10, for example, the shifted cover closing position is adjustable to the appropriate position only by a simple operation (operation of rotation of screw 54) by the user.

The adjustment of the cover closing position of cover 20 based on the configuration of turning mechanism 130 as described above may be performed at the time of assembly of disk drive device 10, as well as after assembly of disk drive device 10. Accordingly, adjustment of the cover closing position of cover 20 is allowed even after attachment of an opening/closing mechanism including turning mechanism 130 to disk drive device 10 in an assembly step of disk drive device 10. In this case, a defect rate of positional deviation of cover 20 in manufacture of disk drive device 10 can considerably improve. In addition, the jig used in the first exemplary embodiment is unnecessary also in the assembly step of disk drive device 10. Accordingly, costs for the jig and for work using the jig can lower at the time of assembly of disk drive device 10.

(Effects and Others)

As described above, a rotation cover opening/closing mechanism according to an embodiment of the present disclosure includes a cover that is transparent and plate-shaped, a shaft body, and a turning mechanism. The cover closes an opening portion formed in a part of an upper surface of device body. One end of the shaft body is perpendicularly fixed to the cover, and at least a part of the shaft body at the other end of the shaft body is inserted into the device body. The turning mechanism rotatably supports the shaft body inside the device body to allow turning of the cover around the shaft body in a plane parallel with the upper surface of the device body. The turning mechanism includes a limitation portion that limits a rotation angle of the shaft body to a fixed range such that the cover turns between a cover closing position where the cover closes the opening portion, and a cover opening position where the cover opens the opening portion.

In addition, a disk drive device according to an embodiment of the present disclosure includes a device body, a cover that is transparent and plate-shaped, a shaft body, and a turning mechanism. The device body includes an opening portion in an upper surface of the device body, and a disk is attached to and detached from the device body via the opening portion. The cover closes the opening portion. One end of the shaft body is perpendicularly fixed to the cover, and at least a part of the shaft body at the other end of the shaft body extends toward an inner space of the device body. The turning mechanism rotatably supports the shaft body inside the device body to allow turning of the cover around the shaft body in a plane parallel with the upper surface of the device body. The turning mechanism limits a rotation angle of the shaft body to a fixed range such that the cover turns between a cover closing position where the cover closes the opening portion, and a cover opening position where the cover opens the opening portion.

Disk drive device 10 is an example of the disk drive device. Opening/closing mechanism 31 is an example of the opening/closing mechanism. Cover 20 is an example of the transparent and plate-shaped cover. Shaft body 21 is an example of the shaft body. Each of turning mechanism 30 and turning mechanism 130 is an example of the turning mechanism. Device body 10a is an example of the device body. Opening portion 11 is an example of the opening portion. Each of cylindrical body 38, stopper 52, and cover closing position adjuster 60 is an example of the limitation portion.

For example, opening/closing mechanism 31 according to the example presented in the first exemplary embodiment includes cover 20 that is transparent and plate-shaped, shaft body 21, and turning mechanism 30. Opening/closing mechanism 31 according to the example presented in the second exemplary embodiment includes cover 20 that is transparent and plate-shaped, shaft body 21, and turning mechanism 130. Cover 20 closes opening portion 11 formed in a part of the upper surface of device body 10a. One end of shaft body 21 is fixed perpendicularly to cover 20, and at least a part of shaft body 21 at the other end of shaft body 21 is inserted into device body 10a. Turning mechanism 30 or 130 rotatably supports shaft body 21 inside device body 10a to allow turning of cover 20 around shaft body 21 in a plane parallel with the upper surface of device body 10a. Turning mechanism 30 includes cylindrical body 38 that limits a rotation angle of shaft body 21 to the fixed range such that cover 20 turns between a cover closing position where cover 20 closes opening portion 11, and a cover opening position where cover 20 opens opening portion 11. Turning mechanism 130 includes cylindrical body 38, stopper 52, and cover closing position adjuster 60 that limit a rotation angle of shaft body 21 to the fixed range such that cover 20 turns between a cover closing position where cover 20 closes opening portion 11, and a cover opening position where cover 20 opens opening portion 11.

According to opening/closing mechanism 31 thus configured, device body 10a contains turning mechanism 30 or 130 which has a structure for limiting the rotation angle of shaft body 21 to the fixed range. In this case, cover 20 can stop at an appropriate cover opening position or appropriate cover closing position without a necessity of providing protrusion portion 22 at a location visible in the external appearance. This configuration therefore can realize rotation cover opening/closing mechanism 31 capable of stopping cover 20, which is transparent and rotates in a plane, at an appropriate cover closing position without deteriorating design quality.

According to the rotation cover opening/closing mechanism, a protrusion portion fixed to the shaft body may be provided on a side surface of the shaft body. The limitation portion may limit a turnable angle of the protrusion portion turning in accordance with rotation of the shaft body to the fixed range.

Protrusion portion 22 is an example of the protrusion portion.

For example, according to the example presented in the first exemplary embodiment, protrusion portion 22 fixed to shaft body 21 is provided on the side surface of shaft body 21. Cylindrical body 38 limits a turnable angle of protrusion portion 22 turning in accordance with rotation of shaft body 21 to the fixed range. According to the example presented in the second exemplary embodiment, protrusion portion 22 fixed to shaft body 21 is provided on the side surface of shaft body 21. Cylindrical body 38, stopper 52, and cover closing position adjuster 60 limit a turnable angle of protrusion portion 22 turning in accordance with rotation of shaft body 21 to the fixed range.

According to opening/closing mechanism 31 thus configured, the turnable angle of protrusion portion 22 fixed to shaft body 21 is limited. In this case, the turnable angle of shaft body 21 is limited to the fixed range. Accordingly, opening/closing mechanism 31 is capable of stopping cover 20 at an appropriate cover closing position by using a relatively simple mechanism.

According to the rotation cover opening/closing mechanism, the limitation portion may be a cylindrical body that covers the shaft body such that the shaft body is rotatable. An opening may be formed in a side surface of the cylindrical body. The protrusion portion is exposed through the opening. The opening limits the turnable angle of the protrusion portion turning in accordance with rotation of the shaft body to the fixed range.

Opening 38a is an example of the opening which limits the turnable angle of the protrusion portion to the fixed range.

For example, according to the example presented in the first exemplary embodiment or the second exemplary embodiment, cylindrical body 38 is a cylindrical body that covers shaft body 21 such that shaft body 21 is rotatable. Opening 38a is formed in the side surface of cylindrical body 38. Protrusion portion 22 is exposed through opening 38a. Opening 38a limits the turnable angle of protrusion portion 22 turning in accordance with rotation of shaft body 21 to the fixed range.

According to opening/closing mechanism 31 thus configured, cylindrical body 38 corresponding to an example of the limitation portion performs both a function of supporting shaft body 21, and a function of limiting the turnable angle of protrusion portion 22 to the fixed range in accordance with the limitation by opening 38a. Accordingly, opening/closing mechanism 31 is capable of stopping cover 20 at an appropriate cover closing position by using a relatively smaller number of parts.

According to the rotation cover opening/closing mechanism, the limitation portion may include a stopper that comes into contact with the protrusion portion when the cover turns and reaches the cover closing position, and a cover closing position adjuster that adjusts a position of the stopper in the device body to adjust a position of the protrusion portion in the device body at the time of contact between the protrusion portion and the stopper.

Stopper 52 is an example of the stopper. Cover closing position adjuster 60 is an example of the cover closing position adjuster.

For example, according to the example presented in the second exemplary embodiment, turning mechanism 130 includes stopper 52 that comes into contact with protrusion portion 22 when cover 20 turns and reaches the cover closing position, and cover closing position adjuster 60 that adjusts a position of stopper 52 in device body 10a to adjust a position of protrusion portion 22 in device body 10a at the time of contact between protrusion portion 22 and stopper 52.

According to opening/closing mechanism 31 thus configured, a position of stopper 52 in contact with protrusion portion 22 in device body 10a is adjustable. In this case, the cover closing position is adjustable even after attachment of opening/closing mechanism 31 to disk drive device 10. Accordingly, a defect rate of positional deviation of cover 20 in manufacture of disk drive device 10 can considerably improve. In addition, even when the cover closing position of cover 20 is deviated from the original position after a start of use of disk drive device 10, the cover closing position of cover 20 can return to an appropriate position through relatively easy adjustment work.

According to the rotation cover opening/closing mechanism, the cover closing position adjuster may include a screw whose head is exposed to an outside of the device body, and a displacement transmitter that converts a shift of the screw produced by rotation of the screw into a shift of the stopper.

Screw 54 is an example of the screw. Displacement transmitter 56 is an example of the displacement transmitter.

For example, according to the example presented in the second exemplary embodiment, cover closing position adjuster 60 includes screw 54 whose head is exposed to an outside of device body 10a, and displacement transmitter 56 that converts a shift of screw 54 produced by rotation of screw 54 into a shift of stopper 52.

According to opening/closing mechanism 31 thus configured, the cover closing position of cover 20 is adjustable by rotation of the head of screw 54 exposed to the outside of disk drive device 10. Accordingly, a user of disk drive device 10 is capable of adjusting the cover closing position of cover 20 through relatively easy adjustment work.

The rotation cover opening/closing mechanism may further include an up-down guide that guides the protrusion portion. The up-down guide may include a slope portion that guides the protrusion portion such that the protrusion portion gradually raises the shaft body when the cover turns from the cover closing position to the cover opening position.

Up-down guide 36d is an example of the up-down guide. Upper surface 36f of up-down guide 36d is an example of the slope portion.

For example, according to the example presented in the first exemplary embodiment or the second exemplary embodiment, rotation cover opening/closing mechanism 31 further includes up-down guide 36d that guides protrusion portion 22. Up-down guide 36d includes upper surface 36f that guides protrusion portion 22 such that protrusion portion 22 gradually raises shaft body 21 when cover 20 turns from the cover closing position to the cover opening position.

According to opening/closing mechanism 31 thus configured, cover 20 is located above the cover closing position when cover 20 turns and reaches the cover opening position. Accordingly, the user easily attaches and detaches a recording medium to and from disk tray 15 provided in opening portion 11 formed in device body 10a.

The rotation cover opening/closing mechanism may further include: a turning portion that turns in linkage with rotation of the shaft body; and a rotational urging spring that is fixed to the device body and the turning portion, and gives rotational force to the shaft body to cause a shift of the cover to the cover closing position when the cover is located closer to the cover closing position than to an intermediate range defined between the cover closing position and the cover opening position, and to cause a shift of the cover to the cover opening position when the cover is located closer to the cover opening position than to the intermediate range.

Turning portion 40b is an example of the turning portion. Rotational urging spring 34 is an example of the rotational urging spring.

For example, according to the example presented in the first exemplary embodiment or the second exemplary embodiment, opening/closing mechanism 31 further includes: turning portion 40b that turns in linkage with rotation of shaft body 21; and rotational urging spring 34 that is fixed to device body 10a (fixing portion 32b) and turning portion 40b, and gives rotational force to shaft body 21 to cause a shift of cover 20 to the cover closing position when cover 20 is located closer to the cover closing position than to an intermediate range defined between the cover closing position and the cover opening position, and to cause a shift of cover 20 to the cover opening position when cover 20 is located closer to the cover opening position than to the intermediate range.

According to opening/closing mechanism 31 thus configured, the user intending to open cover 20 only needs to rotate cover 20 from the cover closing position to a position exceeding the intermediate range. By the excess of the intermediate range, cover 20 shifts to the cover opening position in accordance with urging force generated by rotational urging spring 34 even when the user releases the hand from cover 20. Similarly, the user intending to close cover 20 only needs to rotate cover 20 from the cover opening position to a position exceeding the intermediate range. By the excess of the intermediate range, cover 20 shifts to the cover closing position in accordance with urging force generated by rotational urging spring 34 even when the user releases the hand from cover 20. Accordingly, the user using opening/closing mechanism 31 is capable of opening and closing cover 20 by performing only a relatively smaller number of operations.

MODIFIED EXAMPLES

The first exemplary embodiment and the second exemplary embodiment have been described as examples of the technology disclosed in the present application. However, the technology according to the present disclosure is not limited to these exemplary embodiments, but is applicable to other exemplary embodiments including appropriate modifications, replacements, additions, omissions and the like. In addition, respective constituent elements described in the first and second exemplary embodiments may be combined or modified to create new exemplary embodiments.

Exemplary embodiments including modifications are hereinafter described.

According to the configuration examples of the exemplary embodiments described above, the movable range of protrusion portion 22 protruding from the side surface of shaft body 21 is limited by opening 38a formed in cylindrical body 38 corresponding to the limitation portion. However, the limitation portion may have a configuration different from the configuration described in the exemplary embodiments as long as appropriate limitation is imposed on the movable range of shaft body 21. For example, adoptable is such a configuration in which shaft body 21 has, on its side surface, a recess portion, and cylindrical body 38 has a protrusion portion inserted into an inner circumference of the recess portion. In this case, shaft body 21 and cylindrical body 38 are assembled such that the protrusion portion of cylindrical body 38 is disposed inside the recess portion formed in the side surface of shaft body 21 when shaft body 21 is configured to penetrate cylindrical body 38. The movable range of shaft body 21 is determined in accordance with the position, size, and shape of the recess portion.

According to the configuration examples of the exemplary embodiments described above, up-down guide 36*d* shifts turning protrusion portion 22 upward and downward while supporting protrusion portion 22 via upper surface 36*f* corresponding to an example of the slope portion. However, the slope portion is not limited to this specific example. For example, an oblique linear opening may be formed in the circumferential surface of cylindrical body 38 instead of substantially quadrangular opening 38*a* illustrated in FIG. 3 such that the linear opening functions both as the limitation portion and the slope portion. Alternatively, an oblique linear groove formed in circumferential wall 36*c* of shaft body cover 36 and having a width sufficient for receiving an end of protrusion portion 22 may be provided as the slope portion in place of up-down guide 36*d*. In this case, a length of protrusion portion 22 is required to be larger than the corresponding length according to the exemplary embodiments to secure a length sufficient for reaching the groove from the side surface of shaft body 21.

The configuration of cover closing position adjuster 60 is not limited to the configuration presented in the second exemplary embodiment. Cover closing position adjuster 60 may have any configurations as long as cover closing position adjuster 60 is operable from the outside of disk drive device 10, and allowed to adjust the stop position of protrusion portion 22 in the left-right direction inside disk drive device 10. For example, cover closing position adjuster 60 may be configured to convert rotation of the screw into a linear shift of stopper 52 by using a mechanical mechanism, such as a gear, in place of displacement transmitter 56.

According to the exemplary embodiments, no detailed description is made concerning frictional force generated between respective components. However, it is preferable that frictional force producing useless resistance is lowered. It is further preferable that shapes and materials of respective components are determined appropriately for allowing actions of the respective units and the whole in excess of frictional force based on force applied for necessary actions. Similarly, it is preferable that urging force produced by rotational urging spring 34 or urging force produced by slide urging spring 58, or force resisting the force produced by each of springs 34 and 58 are determined such that the respective parts and the whole appropriately operate.

The shapes, materials, numerical values, positions, connection modes and the like of the respective constituent elements described in the exemplary embodiments are presented only by way of example, and not intended to limit the present disclosure in any way.

For example, while circular cover 20 has been discussed as the target for positional adjustment described in the exemplary embodiments, a target of positional adjustment according to the present disclosure is not limited to cover 20. For example, the present disclosure is applicable to setting or adjustment of a cover closing position to an appropriate position as long as the positional adjustment target is a rotation cover including a not-circular cover. In addition, the target of positional adjustment according to the present disclosure is not limited to a cover of a disk drive device. The present disclosure is applicable to various types of devices and mechanisms each of which includes a mechanism not disposed on or around a rotation body shifting by a rotational operation to define a stop position of the rotation body.

The exemplary embodiments have been described herein by way of example of the technology according to the present disclosure. The accompanying drawings and detailed description have been presented for this purpose.

Accordingly, the constituent elements described and depicted in the accompanying drawings and the detailed description may include not only constituent elements essential for solution of problems, but also constituent elements not essential for solution of problems but only presented by way of example of the foregoing technology. Accordingly, it is not intended that the not essential constituent elements be regarded as essential only based on the fact that these constituent elements are presented in the accompanying drawings and the detailed description.

In addition, various modifications, replacements, addition, omissions and the like may be made for the exemplary embodiments presented herein by way of example of the technology of the present disclosure within the range of the appended claims, or an equivalent range of the appended claims

INDUSTRIAL APPLICABILITY

The present disclosure is applicable to a rotation cover opening/closing mechanism and a disk drive device capable of stopping a cover, which is transparent and rotates in a plane, at an appropriate cover closing position. More specifically, the present disclosure is applicable to a CD, a digital versatile disc (DVD), or a disk drive device such as Blu-ray (registered trademark), for example.

REFERENCE MARKS IN THE DRAWINGS

10: disk drive device
10*a*: device body
11, 11*a*: opening portion
12: power supply button
13: display unit
14: operation button
15: disk tray
16: antenna
17: power supply socket
20: cover
21: shaft body
22: protrusion portion
25: disk holder
26: light pickup
27: illumination unit
28: recess portion
30, 130: turning mechanism
31: opening/closing mechanism
32, 132: base
32*b*: fixing portion
33: damper
33*a*: gear
34: rotational urging spring
36: shaft body cover
36*a*: bottom cylinder
36*b*: flange
36*c*: circumferential wall
36*d*: up-down guide
36*e*: rail
36*f*: upper surface 38: cylindrical body
38a, 40a: opening
39: screw hole
39a: screw
40: rotation cover
40b: turning portion
40c: flange
40d: gear
52: stopper
52a: stopper leg portion
52b: stopper leg tab
52c: hook
54: screw
56: displacement transmitter
56a, 56b: displacement transmitter tab
58: slide urging spring
60: cover closing position adjuster
100: upper housing
132a: guide
132b: base tab

The invention claimed is:

1. A rotation cover opening/closing mechanism comprising:
   a cover that is plate-shaped, and closes an opening portion formed in a part of an upper surface of a device body;
   a shaft body, one end of the shaft body being perpendicularly fixed to the cover, and at least a part of the shaft body at the other end of the shaft body being inserted into the device body; and
   a turning mechanism that rotatably supports the shaft body inside the device body to allow turning of the cover around the shaft body in a plane parallel with the upper surface of the device body,
   wherein the turning mechanism includes a limitation portion that limits a rotation angle of the shaft body to a fixed range such that the cover turns between a cover closing position where the cover closes the opening portion, and a cover opening position where the cover opens the opening portion,
   the shaft body has, on a side surface of the shaft body, a protrusion portion fixed to the shaft body,
   the limitation portion limits a turnable angle of the protrusion portion turning in accordance with rotation of the shaft body to the fixed range, and
   the limitation portion includes:
     a stopper that comes into contact with the protrusion portion when the cover turns and reaches the cover closing position, and
     a cover closing position adjuster that provides for variable adjustment of a position of the stopper in the device body to adjust a position of the protrusion portion in the device body at the time of contact between the protrusion portion and the stopper.

2. The rotation cover opening/closing mechanism according to claim 1, wherein
   the limitation portion is a cylindrical body that covers the shaft body such that the shaft body is rotatable, and
   the cylindrical body has, on a side surface of the cylindrical body, an opening through which the protrusion portion is exposed, and limiting the turnable angle of the protrusion portion turning in accordance with the rotation of the shaft body to the fixed range.

3. The rotation cover opening/closing mechanism according to claim 1, wherein the cover closing position adjuster includes:
   a screw whose head is exposed to an outside of the device body, and
   a displacement transmitter that converts a shift of the screw produced by rotation of the screw into a shift of the stopper.

4. A rotation cover opening/closing mechanism comprising:
   a cover that is plate-shaped, and closes an opening portion formed in a part of an upper surface of a device body;
   a shaft body, one end of the shaft body being perpendicularly fixed to the cover, and at least a part of the shaft body at the other end of the shaft body being inserted into the device body;
   a turning mechanism that rotatably supports the shaft body inside the device body to allow turning of the cover around the shaft body in a plane parallel with the upper surface of the device body,
   a protrusion portion fixed to the shaft body on a side surface of the shaft body, and
   an up-down guide that guides the protrusion portion, wherein
   the turning mechanism includes a limitation portion that limits a rotation angle of the shaft body to a fixed range such that the cover turns between a cover closing position where the cover closes the opening portion, and a cover opening position where the cover opens the opening portion,
   the limitation portion limits a turnable angle of the protrusion portion turning in accordance with rotation of the shaft body to the fixed range, and
   the up-down guide includes a slope portion that guides the protrusion portion such that the protrusion portion gradually raises the shaft body when the cover turns from the cover closing position to the cover opening position.

5. The rotation cover opening/closing mechanism according to claim 4, wherein
   the limitation portion is a cylindrical body that covers the shaft body such that the shaft body is rotatable, and
   the cylindrical body has, on a side surface of the cylindrical body, an opening through which the protrusion portion is exposed, and limiting the turnable angle of the protrusion portion turning in accordance with the rotation of the shaft body to the fixed range.

6. A rotation cover opening/closing mechanism comprising:
   a cover that is plate-shaped, and closes an opening portion formed in a part of an upper surface of a device body;
   a shaft body, one end of the shaft body being perpendicularly fixed to the cover, and at least a part of the shaft body at the other end of the shaft body being inserted into the device body;
   a turning mechanism that rotatably supports the shaft body inside the device body to allow turning of the cover around the shaft body in a plane parallel with the upper surface of the device body, wherein the turning mechanism includes a limitation portion that limits a rotation angle of the shaft body to a fixed range such that the cover turns between a cover closing position where the cover closes the opening portion, and a cover opening position where the cover opens the opening portion,
   a turning portion that turns in linkage with rotation of the shaft body; and
   a rotational urging spring that is fixed to the device body and the turning portion, and gives rotational force to the shaft body to cause a shift of the cover to the cover closing position when the cover is located closer to the cover closing position than to an intermediate range defined between the cover closing position and the cover opening position, and to cause a shift of the cover to the cover opening position when the cover is located closer to the cover opening position than to the intermediate range.

* * * * *